US012071999B2

(12) United States Patent
Biga et al.

(10) Patent No.: US 12,071,999 B2
(45) Date of Patent: Aug. 27, 2024

(54) HYDROFORMED BALANCE SHAFT

(71) Applicant: Linamar Corporation, Guelph (CA)

(72) Inventors: Michael R Biga, Milford, MI (US); Allen W Hale, Commerce, MI (US); Jan Krassler, Zwickau (DE); Mario Lindner, Chemnitz (DE); Markus Haertel, Zwickau (DE)

(73) Assignee: Linamar Corporation, Guelph (CA)

( * ) Notice: Subject to any disclaimer, the term of this patent is extended or adjusted under 35 U.S.C. 154(b) by 56 days.

(21) Appl. No.: 17/624,457

(22) PCT Filed: Jul. 2, 2020

(86) PCT No.: PCT/US2020/040716
§ 371 (c)(1),
(2) Date: Jan. 3, 2022

(87) PCT Pub. No.: WO2021/003400
PCT Pub. Date: Jan. 7, 2021

(65) Prior Publication Data
US 2022/0356925 A1 Nov. 10, 2022

Related U.S. Application Data

(60) Provisional application No. 62/869,706, filed on Jul. 2, 2019.

(51) Int. Cl.
F16F 15/26 (2006.01)
F02B 75/06 (2006.01)

(52) U.S. Cl.
CPC ............ F16F 15/267 (2013.01); F02B 75/06 (2013.01); F16F 15/268 (2013.01)

(58) Field of Classification Search
CPC .................... F02B 75/06; F16F 15/264; F16F 15/267–268
See application file for complete search history.

(56) References Cited

U.S. PATENT DOCUMENTS 6,450,890 B1 * 9/2002 Hendrian ............. F16F 15/268
464/180

FOREIGN PATENT DOCUMENTS

DE 4117876 8/1992
DE 102010022321 A1 * 12/2011 ............ F16F 15/264
DE 102013207800 10/2014
(Continued)

OTHER PUBLICATIONS

ASTM A36, accessed Apr. 14, 2023. www.theworldmaterial.com/astm-a36-steel/. (Year: 2023).*
(Continued)

Primary Examiner — Hung Q Nguyen
Assistant Examiner — Mark L. Greene
(74) Attorney, Agent, or Firm — Miller Canfield

(57) ABSTRACT

An engine balance shaft (20) for an internal combustion engine (24) is provided having reduced total mass and rotational inertia while having sufficient bending stiffness and sufficient unbalance mass. The balance shaft (20) is formed by fixedly coupling a counterweight (56), a front bearing journal (68), a rear bearing journal (60), a tail piece (40), and a nose piece (44) to a hollow tube (52). The hollow tube (52) is hydroformed to expand the diameter of the tube and fasten the desired components to the tube (52).

21 Claims, 23 Drawing Sheets

(56) References Cited

FOREIGN PATENT DOCUMENTS

| | | | | |
|---|---|---|---|---|
| DE | 102014224772 A1 * | 6/2015 | ................ | F16C 3/02 |
| DE | 102015223975 | 6/2017 | | |
| DE | 102017010296 A1 * | 5/2019 | ............ | F16F 15/267 |
| WO | WO-2019179580 A1 * | 9/2019 | ................ | B06B 1/16 |

OTHER PUBLICATIONS

DIN 1.3505, accessed Apr. 12, 2023. www.theworldmaterial.com/100cr6-bearing-steel/. (Year: 2023).*
Hofer, DE 102013207800, machine translation. (Year: 2014).*

* cited by examiner

HYDROFORMED BALANCE SHAFT

CROSS-REFERENCE TO RELATED APPLICATIONS

This application claims priority to U.S. Provisional Application No. 62/869,706, filed on Jul. 2, 2019.

BACKGROUND OF THE INVENTION

1. Field of the Invention

The present invention relates to balance shaft for an internal combustion engine. More particularly, the invention relates to a balance shaft formed by assembling components with a hydroformed tube.

2. Description of Related Art

Internal combustion engines include balancing shafts to compensate for engine vibrations to improve the smooth running and noise of the engine. The balance shaft is generally designed with an offset center of mass which when rotated about the balance shaft primary axis results in a centrifugal force. The resulting centrifugal force is then oriented and rotationally aligned to the engine crankshaft rotation resulting in a cancelation or reduction of the engine vibration forces. Typically, balance shafts are manufactured by casting the balance shaft. Alternatively, a balance shaft can be forged from a steel bar.

An engine balance shaft typically includes an elongated shaft having an axis of rotation extending in a longitudinal direction of the balance shaft. The balance shaft is typically equipped with a pair of bearing journals centered on the axis of rotation for the balance shaft. Needle bearings and/or plain bearings are typically assembled with the bearing journals, allowing the balance shaft to freely rotate once the balance shaft is assembled within an internal combustion engine. The bearing journals support the balance shaft and handle the centrifugal load on the balance shaft.

The mass of the balance shaft is distributed such that the center of mass is spaced apart by from the axis of rotation and positioned below the axis of rotation when the balance shaft is assembled within the internal combustion engine. In addition, the mass of the balance shaft is typically selected and distributed such that there is sufficient mass in predetermined locations to achieve an unbalance mass required for a particular application. While having a low center of mass is desired for optimal performance of the balance shaft, the balance shaft must have a high cross sectional inertia so that the balance shaft has high bending stiffness.

However, conventional constructions of balance shafts that include cast or forged components often struggle with the tradeoffs between keeping the total mass low, positioning the required material to achieve the needed unbalance, and configuring the mass to have a high cross sectional inertia such that the balance shaft has high bending stiffness. In some constructions, structure must be added along or above the axis of rotation in order to achieve the required bending stiffness needed to manage shaft deflection. The additional structure results in additional mass that does not contribute to the unbalance mass, often reducing the unbalance, and requiring further mass added below the axis of rotation to compensate for the added structure and achieving sufficient unbalance mass for the particular application. The additional undesirable mass added to the balance shaft is further undesirable since it directly opposes efforts to reduce component weight to improve engine efficiency when the engines are used in vehicles. Additionally, the increase in total mass of the balance shaft can increase the shaft rotational inertia, decreasing the responsiveness and performance of the balance shaft in the combustion engine.

Therefore, it is desirable to have an engine balance shaft that is lightweight with a low mass. Further, it is desirable to have a balance shaft that has a high cross sectional inertia such that the balance shaft has a high bending stiffness. It is also desirable that the balance shaft have reduced mass without sacrificing bending stiffness. In addition, it is desirable to have a balance shaft of sufficient bending stiffness without requiring mass positioned at and/or above the axis of rotation. On top of this, it is desirable that the balance shaft have low rotational inertia. Finally, it is desirable to easily customize the balance shaft design for numerous engine applications while allowing for reuse of certain components during manufacturing.

SUMMARY OF THE INVENTION

An engine balance shaft for an internal combustion engine is provided having reduced total mass while sufficient bending stiffness and unbalance mass. The balance shaft is formed by fixedly coupling a counterweight(s), a front bearing journal, a rear bearing journal, a tail piece, and a nose piece to a hollow tube. The hollow tube is hydroformed to expand the diameter of the tube and fasten the desired components to the tube.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, like numerals indicate like or corresponding parts throughout the several views.

Figure 1:
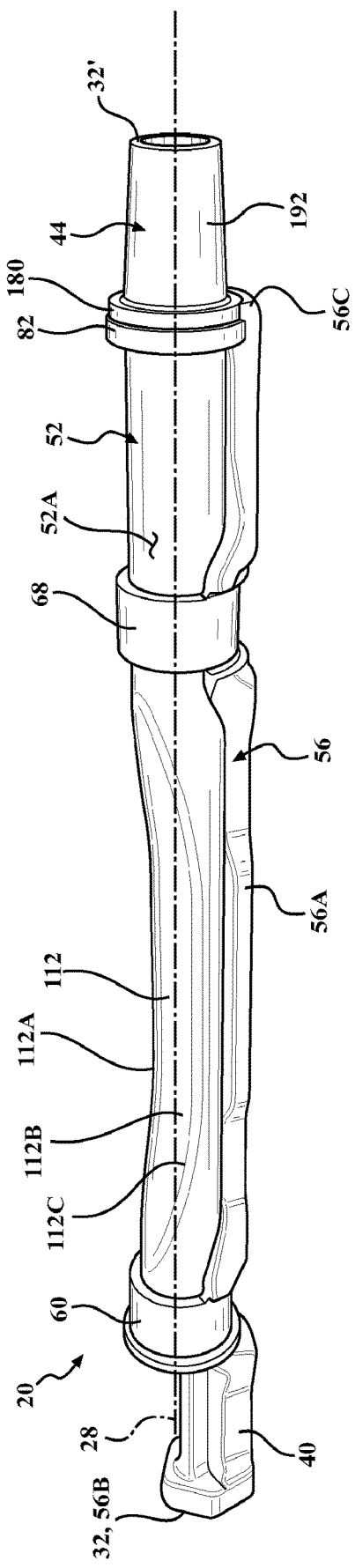
FIG. 1 is a perspective view of an engine balance shaft having an external counterweight, according to a first embodiment of the present invention.
Figure 2:
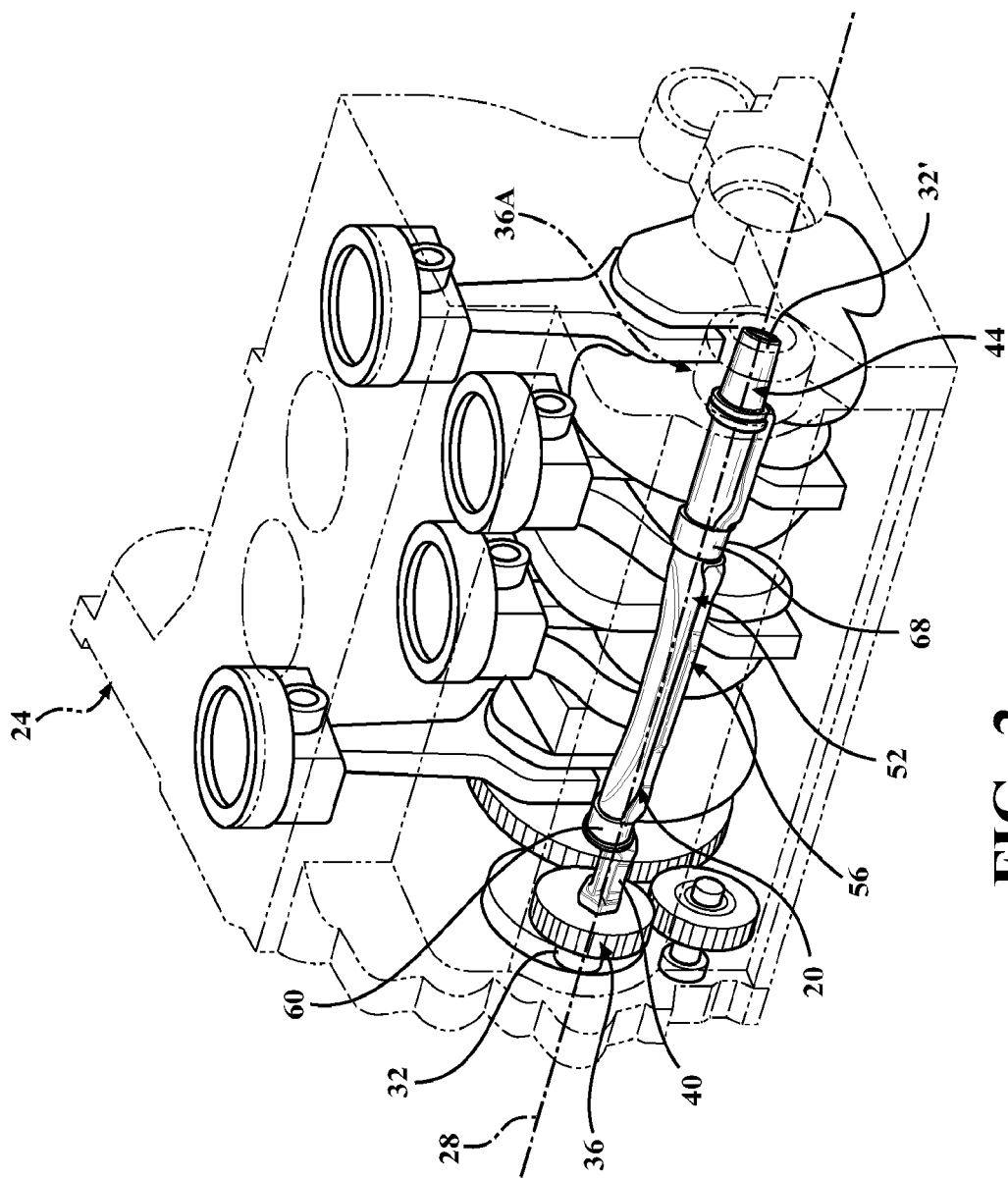
FIG. 2 is a perspective view of the engine balance shaft of FIG. 1 within an internal combustion engine.

An engine balance shaft 20, is shown in FIG. 1, illustrating one embodiment of a balance shaft 20 formed using a hydroforming process. One or more balance shafts 20 are typically included in an internal combustion engine 24, as illustrated in FIG. 2. The novel balance shafts 20 rotate around an axis of rotation 28 to compensate for engine 24 vibrations. As shown in FIG. 2, each end 32, 32' of the novel balance shaft 20 is typically connected to a gear 36 or a sprocket 36A. The selection of and configuration of the gears 36 and/or sprockets 36A fixedly coupled to the novel balance shaft 20 is based on requirements for a specific engine 24. The first and second ends 32, 32' of the novel balance shaft 20 are configured with a tail piece 40 and a nose piece 44, respectively. The tail piece 40 and the nose piece 44 are customized to fixedly couple with one or more drive features such as a gear 36, a sprocket 36A, and the like and as required for a specific engine 24 application. Typically, the one or more drive features are assembled with the nose piece 44 during manufacture of the engine 24.

By using an assembled construction for the novel balance shaft 20 of FIG. 1, the non-useful mass along the axis of rotation 28 can be removed, resulting in a more optimal cross-section of the balance shaft 20.

Figure 3:
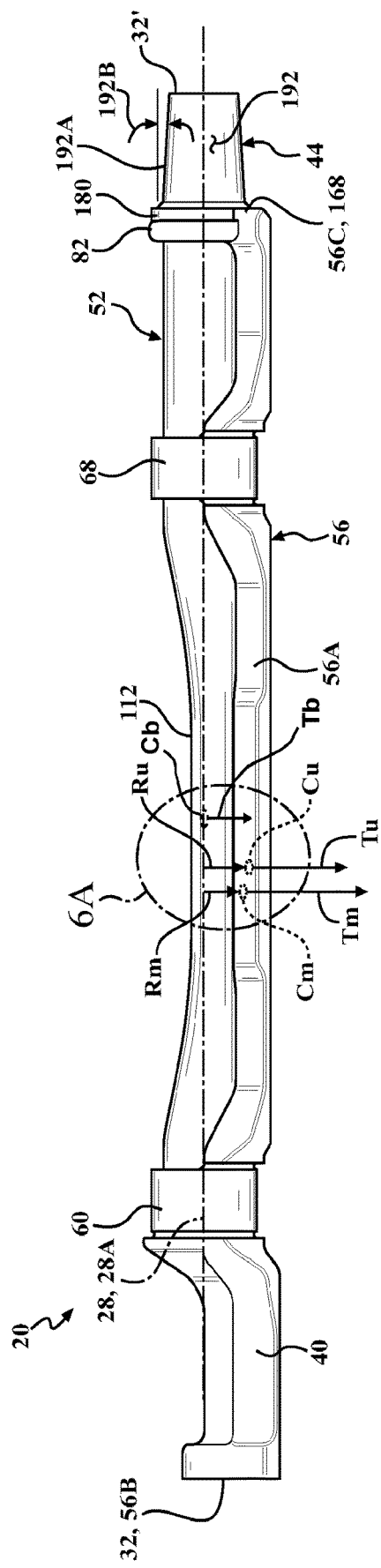
FIG. 3 is a side view of the balance shaft of FIG. 1.
Figure 4:
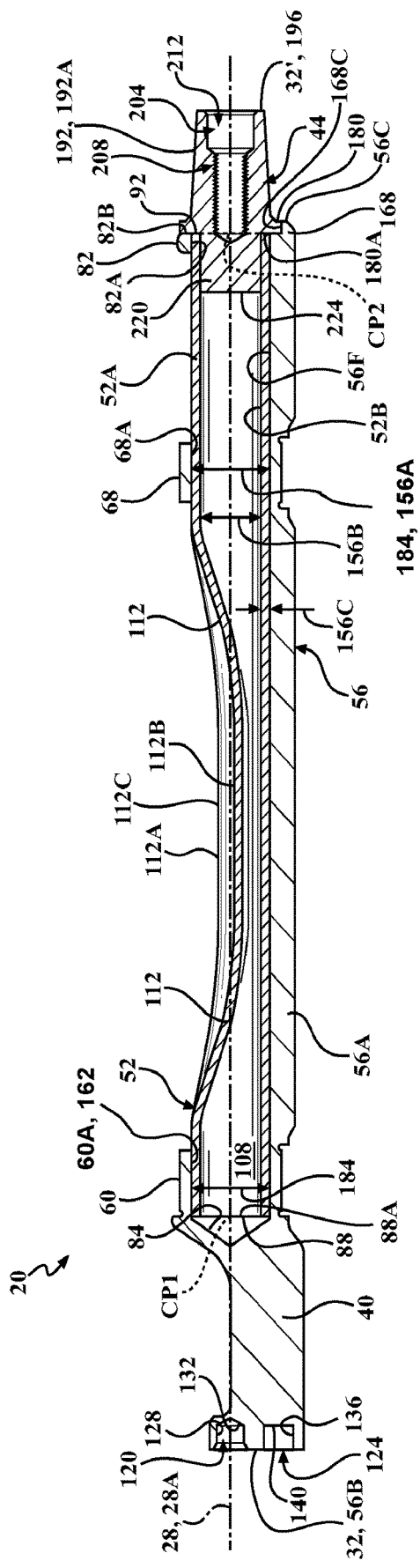
FIG. 4 is a cross-sectional view of the balance shaft of FIG. 3.

FIGS. 3 and 4 show a side view and a cross-sectional view, respectively, of the first embodiment of the novel balance shaft 20. Referring to FIG. 3, the novel balance shaft 20 comprises a hydroformed hollow tube 52, a counterweight frame 56, and a nose piece 44. The hydroforming process offers a unique advantage by being able to form/shape the tube 52 in ways that standard casting, forging, and press-fit construction methods cannot achieve. A forged or cast counterweight frame 56 can concentrate mass where it is most useful to minimize total mass and maximize unbalance.

The first embodiment shown in FIG. 1 illustrates an external elongated counterweight 56 added to the novel balance shaft 20. Integrated within the counterweight frame 56 is the tail piece 40, a rear bearing journal 60, and a front bearing journal 68. The hollow tube 52 preferably comprises a seamless tube 52 of a metal material having a yield strength lower than the yield strength of the counterweight frame 56. In one embodiment, the hollow tube 52 is a seamless steel tube. The tail piece 40 and nose piece 44 are formed of steel, ductile iron, and the like.

Figure 7:
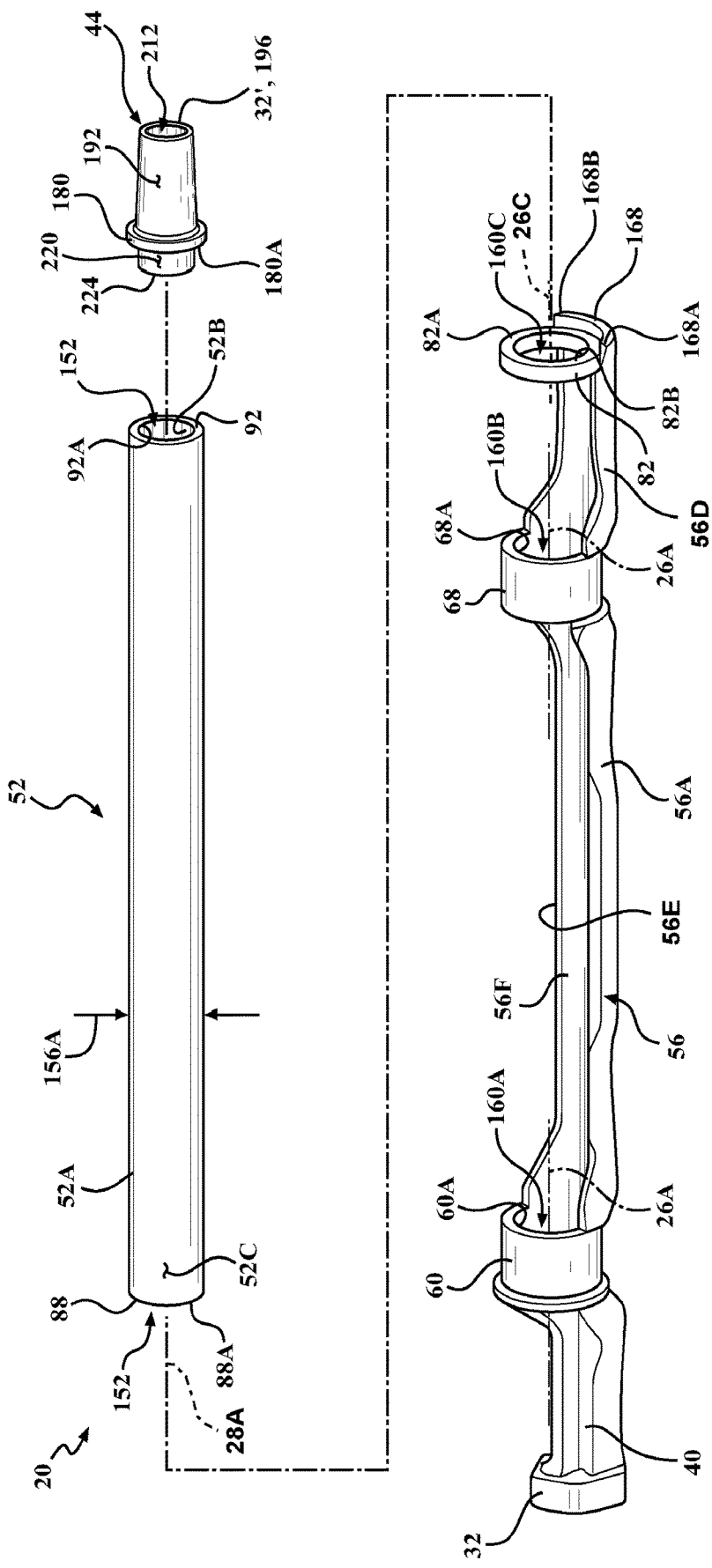
FIG. 7 is an exploded view of the balance shaft of FIG. 1 prior to a hydroforming process and a forming process.

Turning to FIG. 4, the counterweight frame 56 is a single piece forged or cast frame comprising steel, ductile iron, and the like. The counterweight frame 56 comprises a main frame body 56A extending between opposing ends 56B, 56C. As shown in FIG. 7, each of the rear and front bearing journals 60, 68 has a cylindrically-shaped body 60, 68 with a passageway 160A, 160B extending through the respective bearing journal 60, 68. Each of the bearing journals 60, 68 has a longitudinal axis 26A, 26B extending through the respective passageway 160A, 160B. The longitudinal axis 26A of the rear bearing journal 60 is aligned with the longitudinal axis 26B of the front bearing journal 68. Each of the bearing journals 60, 68 is fixedly coupled to the main frame body 56A such that the longitudinal axis 26A, 26B of each bearing journal 60, 68 is aligned to define a rotational axis 28 of the novel balance shaft 20. The passageways 160A, 160B through the bearing journals 60, 68 are aligned and configured to accept the hydroformed tube 52. The rotational axis 28 of the balance shaft 20 is defined by the longitudinal axis 26A of the rear bearing journal 60 and the longitudinal axis 26B of the front bearing journal 68.

Also shown in FIG. 4, a support ring 82 is positioned near the front end 56C of the counterweight frame 56. Referring to FIG. 7, the support ring 82 has a cylindrical shape with a passageway 160C extending longitudinally through the support ring 82 and a mounting face 82B configured to matingly engage with the nose piece 44. A longitudinal axis 26C extends through the passageway 160C of the support ring 82. Like the front and rear bearing journals 68, 60, the support ring 82 is aligned on the counterweight frame 56 such that the rotational axis 28 passes through the longitudinal axis 26C of the support ring 82.

In addition, the passageway 160A defined by an inner surface 60A of the rear bearing journal 60 and an end surface 84 extending across the passageway 160A forms a pocket 162 to accept a rear end 88 of the tube 52, as illustrated in FIG. 4. After insertion of the tube 52 within the bearing journals 60, 68 and support ring 82 of the counterweight frame 56, a front end 92 of the tube 52 is generally positioned flush with the mounting surface 82B of the support ring 82. However, the front end 92 of the tube 52 can be recessed or extend pass the mounting surface 82B of the support ring 82 based on the requirements of specific engine 24 applications.

The total mass Tm of the novel balance shaft 20 is comprised of two constituent masses further defined as the balanced mass Tb and the unbalance mass Tu. Total mass Tm is the simple summation of its constituents Tb and Tu. Balanced mass Tb is considered balanced with respect to the rotational axis 28 of the novel balance shaft 20. The center of mass Cb of the balanced mass Tb is located on the rotational axis 28. In contrast, the unbalance mass Tu has an unbalance center of mass Cu offset a radial distance Ru from the rotational axis 28. FIGS. 3 and 6A diagrammatically illustrate the locations of the unbalance center of mass Cu, the balanced center of mass Cb, and the total center of mass Cm as well as the relative magnitudes for the unbalanced mass Tu, balanced mass Tb, and total mass Tm. The illustration is to represent relative values and not the actual values for the parameters Cu, Cb, Cm, Tu, Tb, Ru.

Returning to FIG. 3, the novel balance shaft 20 has a total mass Tm as well as a center of mass Cm. The total mass Tm is effectively the weight of the novel balance shaft 20. Recall the novel balance shaft 20 has an unbalance mass Tu located a radial distance Ru from the rotational axis 28. During operation as the novel balance shaft 20 turns about its rotational axis 28, the aforementioned unbalance mass Tu results in an unbalanced condition for the rotating shaft 20 causing a radial force from the balance shaft 20 through the bearing journals 60, 68 that is then imparted to the engine 24 structure. Dependent on the counterweight configuration, the radial force could also be an overturning moment. Those skilled in the art manipulate this force or moment imparted to the engine 24 to counteract and thereby reduce or cancel the engine 24 vibration resulting from operation. The desired values for unbalance mass Tu, unbalance center of mass Cu, and radial distance Ru are crafted for each specific engine 24 application with different engine 24 configurations and displacements requiring optimal values for Tu, Cu, and Ru to ensure smooth vibration-free operation. The desired unbalance mass Tu of the novel balance shaft 20 is selected based on the operating conditions within the engine 24. Stated previously, desired responsiveness and engine efficiency can be achieved by minimizing the rotational inertia I and total mass Tm of the novel balance shaft 20 to as low of a value as is practical.

The total mass Tm, the balanced mass Tb, the unbalance mass Tu, and the radial distance Ru from the rotational axis 28 of the unbalance center of mass Cu affect the rotational inertia I of the novel balance shaft 20. Adjusting the mass Tm, the balanced mass Tb, and the unbalance mass Tm directly affects the rotational inertial I of the novel balance shaft 20.

Of note, the novel balance shaft 20 relies on a hollow tube 52 that has an air void 108 along the rotational axis 28, as illustrated in FIG. 4. The inclusion of the air void 108 within the tube 52 reduces the mass at and above the rotational axis 28 of the novel balance shaft 20. Instead of relying on mass located near the rotational axis 28 to impart bending stiffness, the novel balance shaft 20 includes a formed shape 112 within the tube 52 to impart bending stiffness, as illustrated in FIGS. 1 and 4. Turning to FIG. 1, the formed shape 112 includes an arcuate upper contour 112A extending between the bearing journals 60, 68. Further, the arcuate upper contour 112A can include one or more grooves 112B, ridges 112C, and the like selected to impart bending stiffness to the tube 52. The upper contour 112A of the formed shape 112 is also selected in part to provide clearance to mating parts in an engine 24 if required. Finally, repositioning the upper surface 112 of the tube 52 to near and/or below the rotational axis 28 further contributes to the formation of the unbalance mass Tu and the location of the unbalance center of mass Cu.

Thus, the forming of the upper contour 112, as shown in FIG. 1, increases the bending stiffness of the tube 52 so that less mass is required along the rotational axis 28 to prevent bending of the novel balance shaft 20. Further, the formation of the upper contour 112 moves some of the mass of the tube 52 below the rotational axis 28 so that the unbalance mass Tu is increased. Formation of the upper contour 112 can also affect the radius of unbalance Ru. Adjusting the formed shape 112 can adjust the unbalance mass Tu and the radius of unbalance Ru within in a range, potentially allowing for fine tuning of the properties of the novel balance shaft 20 for different engine 24 applications. If only a minor change is required for the unbalance mass Tu and the radius Ru of the unbalance center of mass Cu, then this change can be achieved by adjusting the upper surface 112 of the formed section 112 such that more or less mass is moved below the rotational axis 28. Thus, a minor change in the formed shape 112 can positively affect both the amount of unbalance mass Tu as well as affecting the radial distance Ru of the unbalance center of mass Cu for fine tuning the novel balance shaft 20 for use in a plurality of engine 24 applications.

Figure 5:
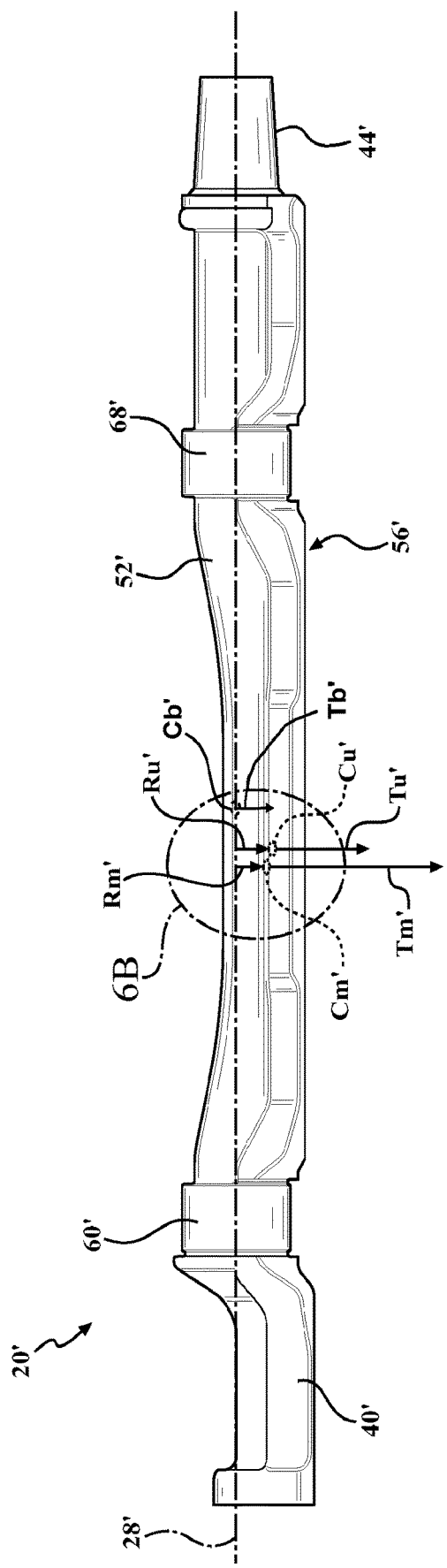
FIG. 5 is a side view of a known traditional engine balance shaft.

One benefit of the novel balance shaft 20 over traditional balance shaft construction 20' is illustrated by comparing FIG. 5 with FIG. 3. FIG. 5 illustrates an exemplary traditional balance shaft 20' having the same general shape and volume as the novel balance shaft 20 of FIG. 3. In contrast to the novel balance shaft 20, the traditional balance shaft 20' has a counterweight frame 56' with integrated front and rear bearing journals 68', 60', tail piece 40', nose piece 44', and upper frame portion 52'. The bearing journals 60', 68' are aligned to define a rotational axis 28' when the traditional balance shaft 20' is included in an engine 24. Further, the tail piece 40' and a nose piece 44' are configured to interface with gears 36 and/or sprockets 36A.

Figure 6B:
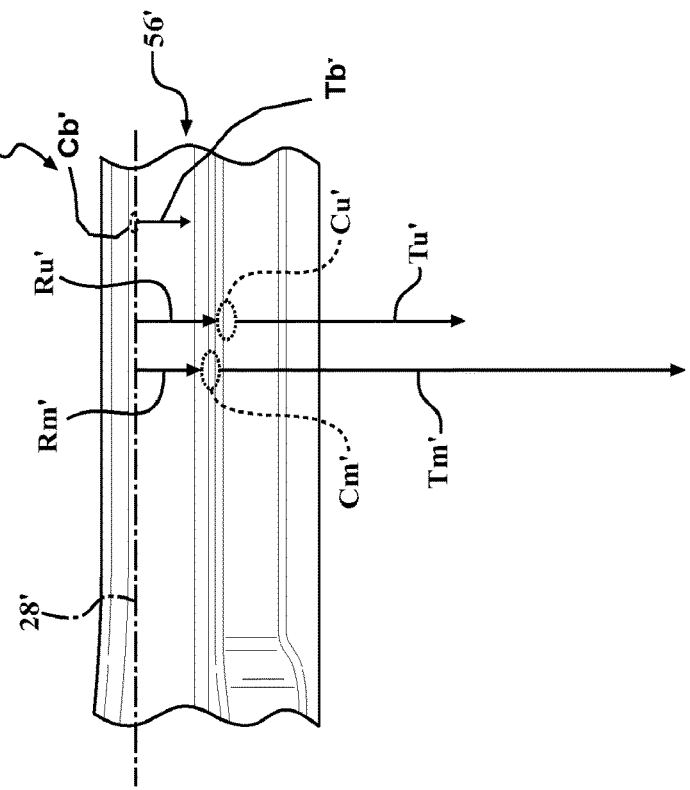
FIG. 6B is an enlarged view of portion 6B of the known balance shaft of FIG. 5, illustrating a total mass Tm' and an unbalance mass Tu' of the known balance shaft.
Figure 6A:
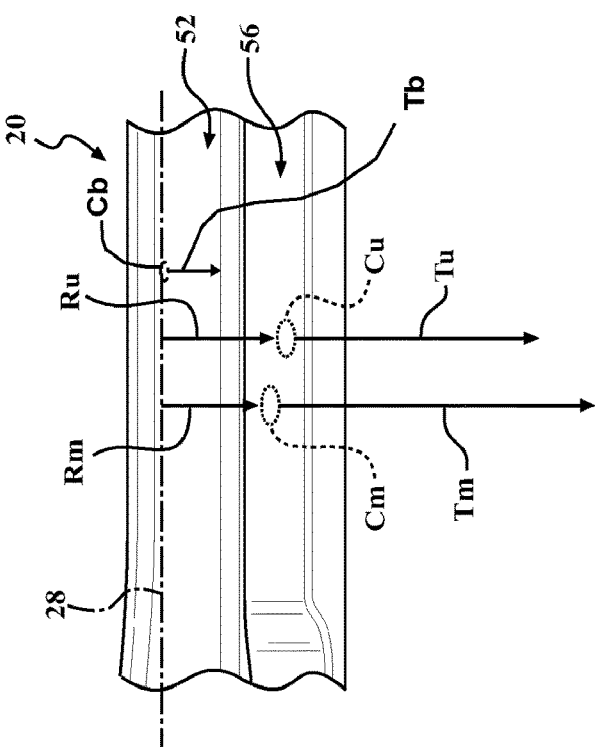
FIG. 6A is an enlarged view of portion 6A of the balance shaft of FIG. 3, illustrating a total mass Tm and an unbalance mass of the balance shaft.

As illustrated in FIGS. 5 and 6B, the traditional balance shaft 20' has a total mass Tm' having a center of mass Cm' spaced apart from the rotational axis 28' by a distance Rm', a balanced mass Tb' having a center of mass Cb' aligned with the rotational axis 28', and an unbalanced mass Tu' having a center of mass Cu' spaced apart from the rotational axis 28' by a distance Ru'. Since the hollow tube 52 of the novel balance shaft 20 has been replaced by cast/forged metal, as indicated by element 52' of FIG. 5, the overall mass Tm' of the traditional balance shaft 20' is greater than the overall mass Tm of the novel balance shaft 20. The balanced mass Tb' may be increased or decreased with respect to the balanced mass Tb of the novel balance shaft 20 depending on the distribution of the air void 108 around the axis of rotation 28. The change in the balanced mass Tb' in comparison to the balanced mass Tb of the novel balance shaft 20 will likely shift the location of the center of mass Cm' within the traditional balance shaft 20'. Likewise, the unbalanced mass Tu' may be increased or decreased with respect to the unbalanced mass Tu of the novel balance shaft 20, depending in part on the geometry of the traditional balance shaft 20' and the change in the balanced mass Tb'.

Essentially, the traditional balance shaft 20' of FIG. 5 relies on cast/forged metal to assure sufficient cross-sectional inertia along the rotational axis 28' to resist bending. FIGS. 5 and 6B illustrate representative locations of the unbalance center of mass Cu' and the center of mass Cm' as well as representative magnitudes of the total mass Tm', the balanced mass Tb', and the unbalance mass Tu' for the traditional balance shaft 20' having the same approximate volume as the novel balance shaft 20. Adjusting the total mass Tm', the balanced mass Tb', the unbalance mass Tu', and the radial distance Ru' from the rotational axis 28' of the unbalance center of mass Cu' affect the rotational inertia I of the traditional balance shaft 20'. The illustrations are not indicative of the actual values for these parameters Cu', Cm', Tu, Tm', Tb' and Ru'.

It is more difficult to fine tune the traditional balance shaft 20' of FIG. 5 for a plurality of engine 24 applications than for the novel balance shaft 20. For example, while mass can be removed from the traditional balance shaft 20' to reduce the unbalance mass Tu' and potentially adjust the radius Ru' of the unbalance center of mass Cu', removal of mass at and/or above the rotational axis 28' directly affects the bending stiffness of the traditional balance shaft 20'.

In contrast, by adjusting the formed shape 112 of the novel balance shaft 20 of FIG. 1, minor changes in the radius Ru of the unbalance center of mass Cu, as well as minor changes to the balanced mass Tb and the unbalance mass Tu, can be made without affecting the total mass Tm of the novel balance shaft 20. Thus, since the total mass Tm is unaffected by the change in the formed shape 112, the changes in the formed shape 112 will more directly affect the balanced mass Tb, the unbalance mass Tu, and the radius Ru of the unbalance center of mass Cu.

Further, it is more difficult to adjust the unbalanced mass Tu' of the traditional balance shaft 20' than to adjust the unbalance mass Tu of the novel balance shaft 20. Minor changes to the unbalance mass Tu, the balanced mass Tb, and the radius Ru of the unbalance center of mass Cu can be accomplished in the novel balance shaft 20 by merely adjusting the shape of the formed surface 112. Repositioning the formed surface 112 with respect to the rotational axis 28 has a direct effect on the unbalance mass Tu and the radius Ru of the unbalance center of mass Cu. Further, as explained with respect to additional embodiments of the novel balance shaft 20 shown in FIGS. 13-22, additional mass can be placed within the air void 108 in the tube 52 to adjust the unbalance mass Tu and accordingly adjust the radius Ru of the unbalance center of mass Cu if desired without having to modify certain tools required during manufacturing.

FIGS. 6A and 6B illustrate a representative comparison of the center of mass Cm, Cm', the total mass Tm, Tm', the unbalance center of mass Cu, Cu', the unbalance mass Tu, Tu', the balanced mass Tb, Tb', and the radial distance Ru, Ru' of the unbalance center of mass Cu, Cu' of the novel balance shaft 20 and the traditional balance shaft 20', respectively. Each of the novel and traditional balance shafts 20, 20' are presumed to have the same overall shape and volume. However, the total mass Tm of the novel balance shaft 20 is less than the total mass Tm' of the traditional balance shaft 20' since the novel balance shaft 20 includes an air void 108.

Turning to FIG. 6A, the novel balance shaft 20 is shown as having a center of mass Cm spaced a distance Rm away from the rotational axis 28. While the center of mass Cm is not determined by the rotational axis 28 of the novel balance shaft 20, the distance Rm is shown for comparison purposes. Further, the magnitudes of the total mass Tm and the balanced mass Tb are illustrated by the length of arrows Tm and Tb, respectively. Similarly, the magnitude of the unbalance mass Tu is illustrated by the length of arrow Tu with the unbalance center of mass Cu being spaced apart from the rotational axis 28 by a radial distance of Ru. The length of arrow Tu is shown as less than the length of arrow Tm since the balanced mass Tb does not form part of the unbalance mass Tu. Likewise, the radial distance Ru of the unbalance center of mass Cu is likely a greater distance from the rotational axis 28 than the radial distance Rm of the center of mass Cm. The unbalance center of mass Cu is the center of mass of the unbalance mass Tu and not the center of mass Cm of the novel balance shaft 20.

Examining FIG. 6B, the center of mass Cm' of the traditional balance shaft 20' is illustrated as a distance Rm' spaced apart from the rotational axis 28'. The magnitude of the total mass Tm' of the traditional balance shaft 20' is illustrated by a length of an arrow Tm'. Comparing the total mass Tm' of FIG. 6B with the total mass Tm shown in FIG. 6A, the total mass Tm' has a greater magnitude than the total mass Tm since the air void 108 of the novel balance shaft 20 has been replaced by solid metal in the traditional balance shaft 20'. In contrast, the distance Rm' of the center of mass Cm' of FIG. 6B is shown as a shorter distance than the distance Rm of the center of mass Cm of FIG. 6A. The radial distance Rm' of the center of mass Cm' of the traditional balance shaft 20' is likely less than the radial distance Rm of the center of mass Cm of the novel balance shaft 20 for the same reason the total mass Tu' of the traditional balance shaft 20' is greater than the total mass Tu of the novel balance shaft 20. The replacement of the air void 108 of the novel balance shaft 20 with cast/forged metal in the traditional balance shaft 20' shifts the relative position Rm' of the center of mass Cm' for the traditional balance shaft 20'.

Comparing FIGS. 6A and 6B, while the magnitude of the total mass Tm' of the traditional balance shaft 20' is greater than the magnitude of the total mass Tm of the novel balance shaft 20, the unbalance mass Tu', Tu is likely less for the traditional balance shaft 20' than for the novel balance shaft 20. This disparity in the unbalance mass Tu, Tu' is due to the novel balance shaft 20 having an air void 108 while the traditional balance shaft 20' lacks the air void 108. The actual difference in unbalance mass Tu', Tu of the traditional balance shaft 20' in comparison to the novel balance shaft 20 will depend in part on the actual geometry of the two balance shafts 20, 20' and the volume and location of the air void 108 of the novel balance shaft 20. Thus, the actual unbalance mass Tu' can be equal, greater, and/or less than the unbalance mass Tu of the novel balance shaft 20. Also illustrated, the radial distance Ru' of the unbalance center of mass Cu' of the traditional balance shaft 20' is also affected by substituting cast/forged metal for the air void 108 of the novel balance shaft 20. For the same total volume within the balance shafts 20, 20', the traditional balance shaft 20' will have a greater total mass Tm' and potentially less unbalance mass Tu' than for the novel balance shaft 20.

In the embodiment shown in FIG. 7, the tail piece 40 of the novel balance shaft 20 is integrally formed with the counterweight frame 56. In contrast, the nose piece 44 is formed as a separate piece 44 that is press-fit into the hollow tube 52 after the hollow tube 52 is assembled with the counterweight frame 56. Both the tail piece 40 and the nose piece 44 are customized and designed for a particular engine 24 application as well as for handling in various manufacturing assembly and machining processes. One or both of the tail piece 40 and the nose piece 44 can be manufactured as separate components 40, 44 and assembled with the counterweight frame 56 and/or the tube 52 using a number of generally known processes. As previously disclosed with respect to FIG. 2, a gear 36 or a sprocket 36A can be mounted to each end 32, 32' of the novel balance shaft 20. As such, the tail piece 40 and nose piece 44 are typically configured to matingly engage with the selected gears 36 and/or sprockets 36A specified for particular engine 24 application. One benefit of embodiments having separate tail pieces 40 and/or nose pieces 44 is that the novel balance shaft 20 can be customized for different engine 24 applications that have a variety of gear/sprocket 36, 36A attachment requirements by using different tail and nose pieces 40, 44 with the same counterweight frame 56 and tube 52.

Referring to FIG. 4, the novel balance shaft 20 optionally includes features for attaching to components such as gears/sprockets 36, 36A and further optionally includes features configured for use during manufacturing. For example, one end surface 56B of the tail piece 40 includes a first cavity 120 aligned with the rotational axis 28 of the novel balance shaft 20 and a second cavity 124 offset from the rotational axis 28. The first cavity 120 includes a cylindrical-shaped wall 128 terminating in a conical end portion 132. The second cavity 124 also includes a cylindrical-shaped wall 136. However, the second cavity 124 is terminated with a generally flat surface 140. Both of the first and second cavities 120, 124 are generally used as locating and/or gripping features during manufacturing. As such, the illustrated first and second cavities 120, 128 can vary in configuration, including omitting one or both of these cavities 120, 124. Alternatively, other locating features and mounting features can integrated within the tail piece 40 for machining, handling of the assembly, and for mounting components such as gears 36.

FIG. 7 illustrates an exploded view of the novel balance shaft 20 of FIG. 1 prior to assembly. Referring to FIG. 7, the novel balance shaft 20 comprises the hollow tube 52, the nose piece 44, and the counter weight frame 56. The hollow tube 52 has a cylindrical side wall 52A extending between opposing ends 88, 92 of the tube 52. The cylindrical wall 52A has opposing inner and outer surfaces 52B, 52C. While the hollow tube 52 is illustrated as a cylindrical hollow tube 52, in some embodiments the tube 52 can have other shapes such as a rectangular hollow tube 52 as a non-limiting example. The tube 52 comprises a metal material having a yield strength lower than the yield strength of the counterweight frame 56. A passageway 152 extends longitudinally through the tube 52 between opposing ends 88, 92 of the tube 52, forming a first end opening 88A and an opposing second end opening 92A. In addition, the tube 52 has a tube longitudinal axis 28A defined between center points CP1, CP2 of the first and second end openings 88A, 92A, as illustrated in FIG. 4. The passageway 152 forms the air void 108 within the tube 52. The tube 52 has an outer diameter 156A selected to matingly engage with passageways 160A-160C through the bearing journals 60, 68 and the support ring 82. In addition, the tube 52 has an inner diameter 156B and a wall thickness 156C as shown in FIG. 4. The tube 52, along with the formed contour 112, provides bending stiffness to the finished shaft 20.

Returning to FIG. 7, the counterweight frame 56 is formed from steel, ductile iron, or the like, using a casting and/or a forging process. The counterweight frame 56 can also include machined surfaces and features as required for a specific engine 24 application. The counterweight frame 56 provides a majority of the unbalance mass Tu for the novel balance shaft 20. The counterweight frame 56 can vary in dimensions, shape, volume, and the like, to provide the desired unbalance mass Tu and the radius Ru of the unbalance center of mass Cu for a particular application. However, the counterweight frame 56 will include at least the front and rear bearing journals 60, 68 and the support ring 82. Optionally, in some embodiments the front and rear bearing journals 60, 68 and/or the support ring 82 can be formed as separate parts from the counterweight frame 56 and attached to the counterweight frame 56. In the case where the front and/or rear bearing journals 60, 68 are formed as separate parts, various assembly methods can be used to attach the front and/or rear bearing journals 60, 68 to the counterweight frame 56. In the embodiment shown in FIG. 7, preferably the front and rear bearing journals 60, 68 and the support ring 82 are integrally formed with the counterweight frame 56.

As best illustrated in FIG. 4, the counterweight frame 56 includes a cylindrical-shaped pocket 162 formed by the inner surface 60A of the rear bearing journal 60 and the end wall 84. The pocket 162 and the inner diameter 184 of the rear bearing journal 60 are sized and configured to matingly engage with one end 88 of the tube 52. In some embodiments, the pocket 162 can include locating features for centering and/or positioning the end 88 of the tube 52.

Also illustrated in FIG. 4, the counterweight frame 56 includes a lip 168 extending longitudinally away from the counterweight frame 56, forming a ledge 168 configured to matingly engage and support the nose piece 44. Referring to FIG. 7, the lip 168 is arcuate-shaped having ends 168A, 168B generally aligned with side edges 56D, 56E of the counterweight frame 56. The counterweight frame 56 has an arcuate-shaped inner surface 56F extending between side edges 56D, 56E and extending longitudinally between the end surface 84 of the pocket 162 and the front surface 82B of the support ring 82. As best shown in FIG. 4, the lip 168 has an upper surface 168C offset from the inner surface 56F of the counterweight frame 56. The radial space between the upper surface 168C of the lip 168 and the inner surface 56F of the counterweight frame 56 is configured to matingly engage and support a rim 180 extending circumferentially around the nose piece 44.

Referring to FIG. 4, the inner surface 56F of the counterweight frame 56 is configured to matingly engage with the outer surface 52C of the tube 52. Further, each of the bearing journals 60, 68 and the support ring 82 have an inner diameter 184 configured to matingly fit with the outer diameter 156A of the tube 52. The inner diameters 184 are selected for ease of assembly with the tube 52, i.e., the inner diameter 184 is preferably selected as slightly larger than the outer diameter 156A of the tube 52.

Returning to FIG. 7, the nose piece 44 is preferably made out of a metal material such as steel, ductile iron, and the like. In the embodiment shown in FIG. 7, the nose piece 44 has a generally cylindrical-shaped main body portion 192 extending between the rim 180 and a front end 196 of the nose piece 44. The shape and dimensions of the nose piece 44 can vary greatly since the nose piece 44 is configured to matingly engage with a gear 36 or a sprocket 36A when assembled as part of an engine 24. Referring to FIG. 3, the main body portion 192 of the nose piece 44 optionally has a profile 192A that is tapered towards the rotational axis 28 by an angle 192B. The angle 192B and the profile 192A are selected based on assembly requirements for the selected gear 36 or sprocket 36A. Internal features 204, 208, 212 of the nose piece 44 are illustrated in FIG. 4. In the embodiment shown in FIG. 4, the nose piece 44 includes recessed cylindrical bore 204 extending along the rotational axis 28 of the nose piece 44. A threaded bore 208 extends away from the recessed cylindrical bore 204 along the rotational axis 28. A passageway 212 extends into the bores 204, 208. The recessed bore 204 and the threaded bore 208 are sized and configured to matingly engage with a bolt inserted into the passageway 212. Typically, a bolt is used to fixedly couple a gear/sprocket 36, 36A to the nose piece 44. The recessed bore 204 can also be used to as a fastening location for machining and assembly processes. Like the external surface 192A of the nose piece 44, the internal bores 204, 208 are sized and configured based on desired engine 24 applications. Thus, the recessed internal bores 204, 208 can have different configurations, including omitting one or both bores 204, 208 as required for specific embodiments.

Also shown in FIG. 4, the rim 180 of the nose piece 44 has a mounting surface 180A configured to matingly engage with the mounting face 82B on the support ring 82. Projecting perpendicularly away from the mounting surface 180A of the nose piece 44 is a cylindrical-shaped projection 220 configured to matingly engage with the bore 152 passing through the tube 52. The projection 220 terminates at an end surface 224 as shown in FIG. 7.

Figure 8:
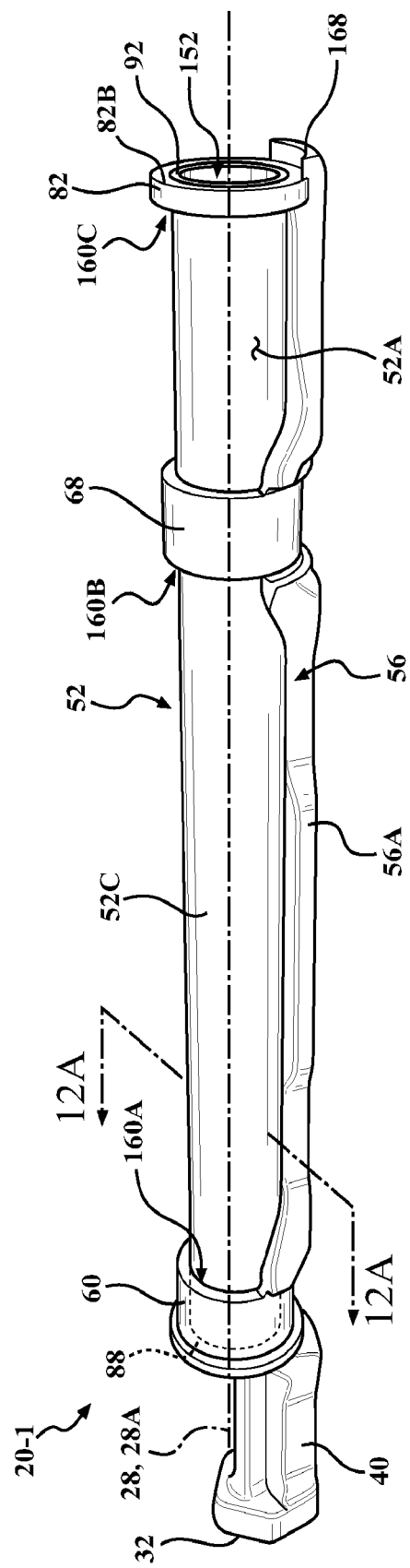
FIG. 8 is a perspective view of a tube of FIG. 7 assembled with a counterweight frame of FIG. 7 to form a tube and counterweight frame assembly prior to the tube being deformed by a hydroforming process and a forming process.
Figure 9:
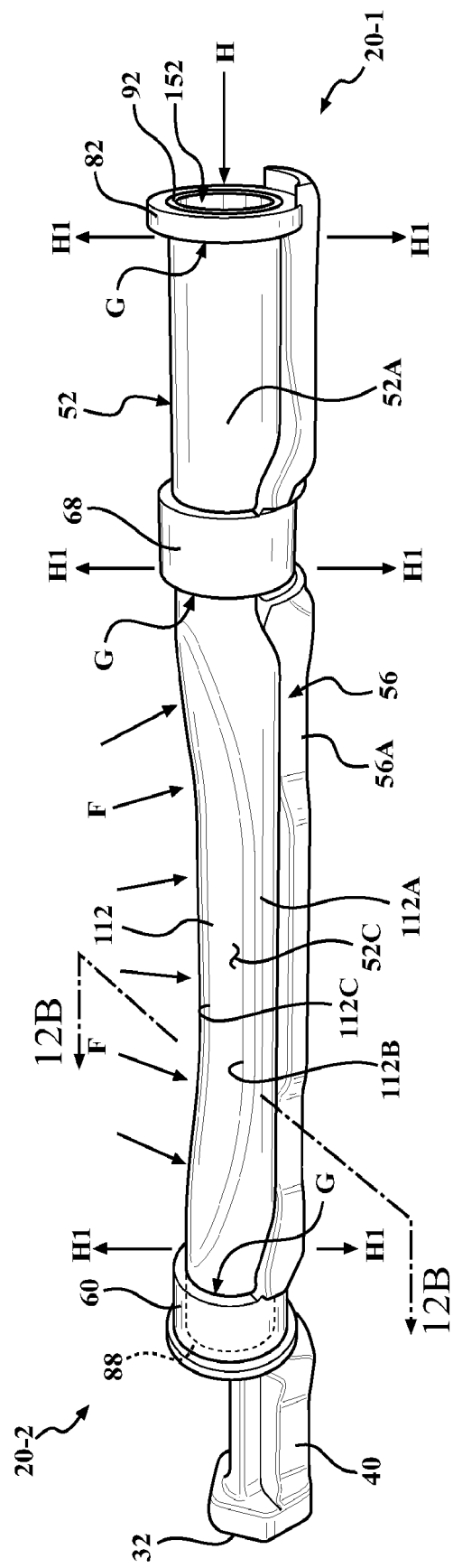
FIG. 9 is a perspective view of the tube and counterweight frame assembly of FIG. 8 after the tube is deformed by a hydroforming process and a forming process.

The assembly method of the novel balance shaft 20 of FIG. 1 is illustrated in FIGS. 8-11. Referring to FIG. 8, the tube 52 is inserted into counterweight frame 56 along the rotational axis 28 and through the passageways 160A, 160B, 160C in the front and rear bearing journals 60, 68 and the support ring 82, forming subassembly 20-1. When the tube 52 is fully inserted into the counterweight frame 56, the front end 92 is adjacent the mounting face 82B of the support ring 82. The outer diameter 156A (shown in FIG. 7) of the tube 52 is sized for easy insertion into the counterweight frame 56. Further, in the embodiment shown in FIG. 7, the tube 52 has a cylindrical shape when the tube 52 is initially inserted into the front and rear bearing journals 68, 60. FIG. 12A shows a cross-sectional view of the tube 52 along section line 12A-12A of FIG. 8, illustrating the shape of the tube 52 prior to hydroforming and deforming the side wall 52A. Returning to FIG. 8, when the tube 52 is initially inserted into the front and rear bearing journals 68, 60, the longitudinal axis 28A of the tube 52 generally aligns with the rotational axis 28 through the front and rear bearing journals 68, 60. Subassembly 20-1 undergoes a hydroforming process and a forming process as illustrated in FIG. 9 to form subassembly 20-2. In the hydroforming process H, fluid is inserted along arrow H to pressurize the interior 108 of the tube 52, causing the outer surface 52C to expand, as illustrated by arrows H1. The hydroforming process H forces the outer surface 52C of the tube 52 to expand to fully seat the counterweight frame 56, the bearing journals 60, 68, and the support ring 82 with the tube 52. The hydroforming process H eliminates clearance gaps G between the tube 52, the bearing journals 60, 68, and the support ring 82 and locks the tube 52 in place on the counterweight frame 56. After the hydroforming process H and the forming process are complete, fluid inserted into the tube 52 is removed from the tube 52.

The subassembly 20-1 undergoes the forming process F, illustrated by arrows F shown in FIG. 9, wherein pressure F is applied to the tube 52 to deform the upper surface 52C of the tube 52 into the contoured shape 112 extending between the front and rear bearing journals 60, 68. Pressure F is applied to the tube 52 using a die, a moving slide, or the like. In one embodiment, the tube 52 is pressurized during the hydroforming process H with an amount of pressure maintained within the tube 52 during the forming process F while external deformation occurs.

Figure 12B:
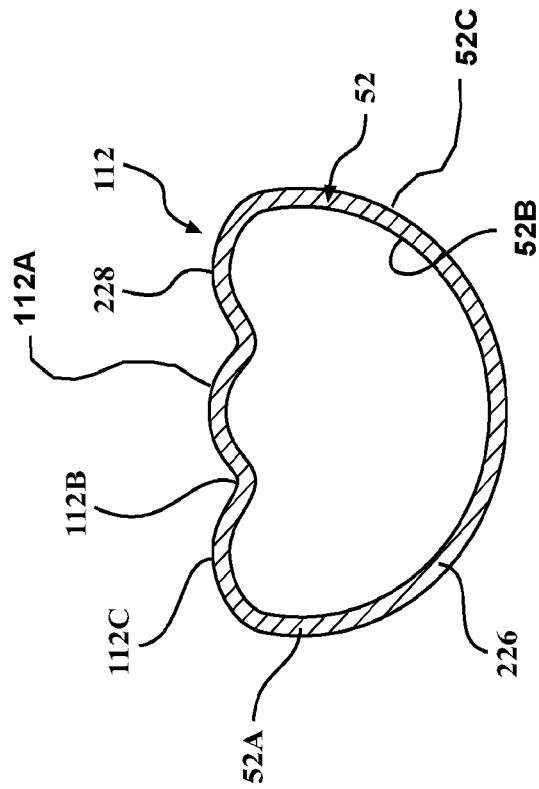
FIG. 12B illustrates a cross-sectional view along section line 12B-12B of one embodiment of a portion of the tube of FIG. 9 after the tube has been deformed by the hydroforming process and the forming process.
Figure 12A:
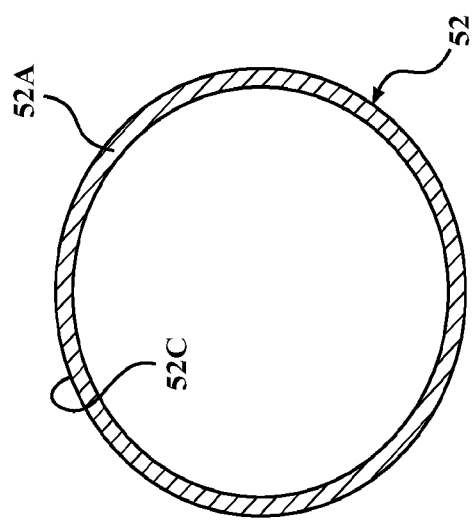
FIG. 12A illustrates cross-sectional view along section line 12A-12A of the tube of FIG. 8 prior to the tube being deformed by the hydroforming process and the forming process.

FIG. 12B shows one embodiment of the cross-sectional shape of the tube 52 after hydroforming and deforming the side wall 52A. Prior to the hydroforming and forming processes, the tube 52 had a cylindrical shape, as illustrated in FIG. 12A. During the hydroforming and forming processes H, F illustrated in FIG. 9, a portion 112 of the outer surface 52C of the tube 52 is deformed into a contoured shape 112A having one or more grooves 112B and ridges 112C, as shown in FIG. 12B. The portion 112 of the tube 52 has a non-cylindrical shape after being deformed by the hydroforming and forming processes H, F. The contoured shape 112 increases the bending stiffness of the tube 52. A variety of contoured shapes 112 can be selected for the tube 52 based in part on the amount of bending stiffness desired for a particular engine 24 application.

The hydroforming and forming processes H, F shown in FIG. 9 can be performed simultaneously on subassembly 20-1 or performed separately depending on desired manufacturing process flow. Further, the hydroforming process H can be performed prior to or after the forming process F. Completing both of the hydroforming and forming processes H, F transforms subassembly 20-1 into subassembly 20-2. The labels of various subassemblies 20-1, 20-2, and the like are purely descriptive and reflect the various stages of manufacture shown in the Figures.

Figure 10:
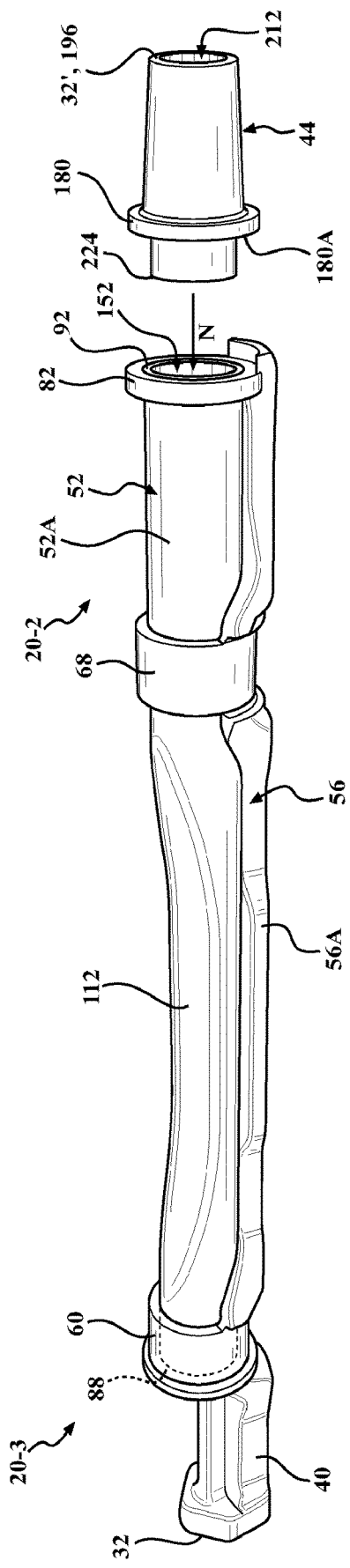
FIG. 10 is a perspective view of the deformed tube and counterweight assembly of FIG. 9 being assembled with the nose piece of FIG. 7.
Figure 11:
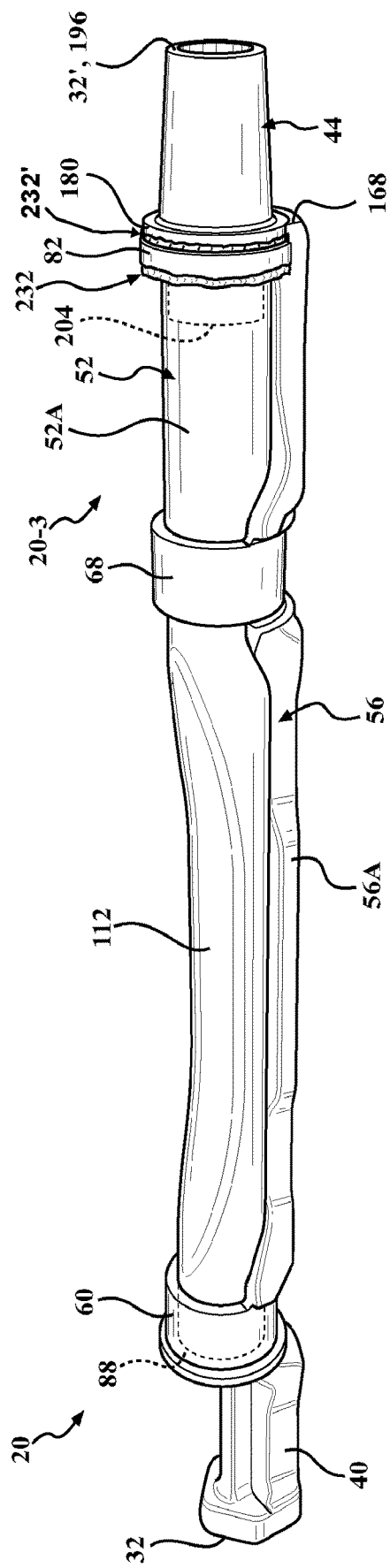
FIG. 11 is a perspective view of the balance shaft of FIG. 1, illustrating a welding process to fixedly couple the nose piece to the tube.
Figure 13:
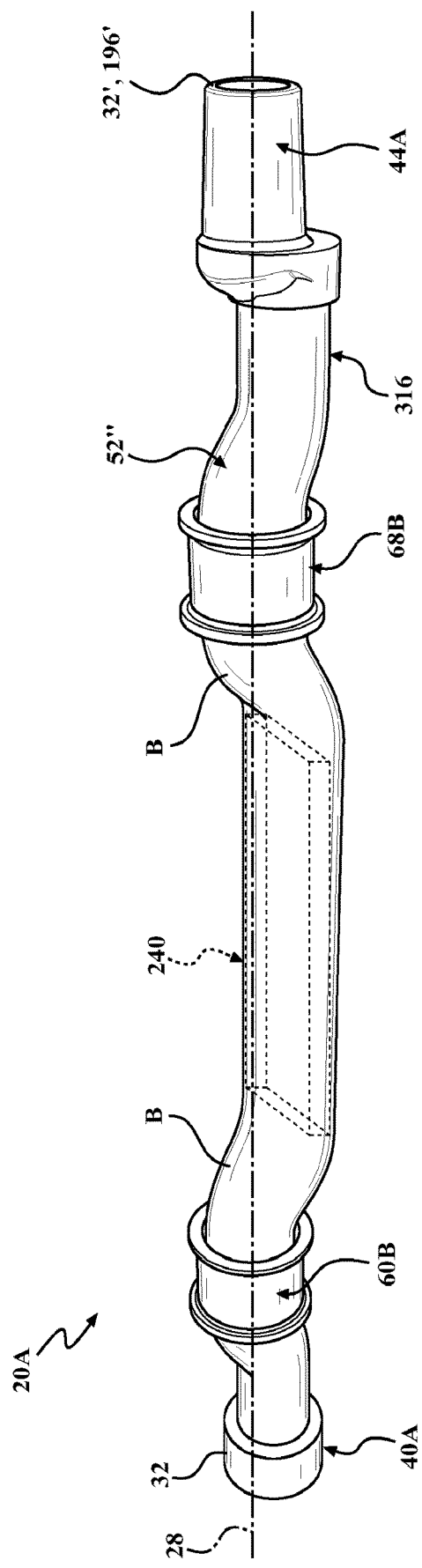
FIG. 13 is a perspective view of an engine balance shaft having an internal counterweight, according to a second embodiment of the present invention.

FIG. 10 illustrates the end 224 of the nose piece 44 being inserted into the passageway 152 of the tube 52, as illustrated by arrow N. The end 224 of the nose piece 44 is pressed into the tube 52 in some embodiments to form subassembly 20-3. Referring to FIG. 13, the subassembly 20-3 is optionally welded using a laser welding process or any other welding process, as illustrated by elements 232 and 232', to fixedly couple the nose piece 44 to the tube 52 and/or to the support ring 82. Welding the nose piece 44 to the tube 52 to the counterweight frame 56, and/or to the support ring 82 using a laser process 232, 232' or the like forms the novel balance shaft 20 shown in FIGS. 1 and 11. Alternatively, the nose piece 44 can be press-fit as an assembly method using mechanical interference. For example, the nose piece 44 can be fixedly coupled to the tube 52 by an elastic interference fitment between the nose piece 44 and the passageway 152 in the tube 52.

A second embodiment of the novel balance shaft 20A is shown in FIGS. 13-20. While the first embodiment of the novel balance shaft 20 included an external counterweight frame 56, the second embodiment 20A shown in FIG. 13 includes an internal counterweight 240. As in the first embodiment, the novel balance shaft 20A includes a hollow tube 52" providing sufficient bending stiffness to the novel balance shaft 20A. The counterweight 240 is inserted into the hollow tube 52" as further described below. Bends B formed in the tube 52" increase the bending stiffness of the novel balance shaft 20A.

Figure 14:
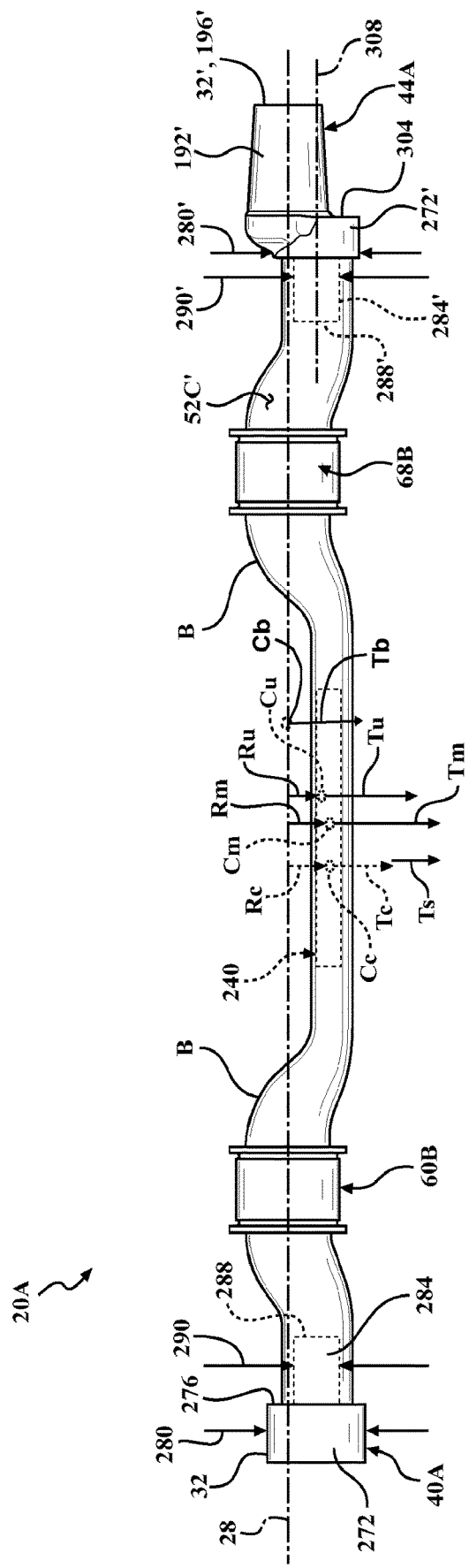
FIG. 14 is a side view of the balance shaft of FIG. 13.

Referring to FIGS. 13 and 14, the second embodiment of the novel balance shaft 20A includes front and rear bearing journals 68B, 60B, a tail piece 40A, and a nose piece 44A. The front and rear bearing journals 68B, 60B are aligned to define a rotational axis 28. The tube 52" is formed such that the bearing journals 60B, 68B are aligned with the rotational axis 28 and the counterweight 240 is spaced apart from the rotational axis 28. In the second embodiment of the novel balance shaft 20A, each specific functional area (nose piece 44A, tail piece 40A, bearing journals 60B, 68B, counterweight 240) are individually placed on the hollow tube 52" along the length thereof where desired. The tube 52" is then pressurized from the inside 152' of the tube 52" during the hydroforming process H to expand the diameter 156A' of the tube 52" and locking selected pieces 60B, 68B in place. Certain pieces, such as the tail piece 40A and/or the nose piece 44A are assembled with the tube 52" after the hydroforming process H has been completed.

Turning to FIG. 14, the second embodiment of the novel balance shaft 20A has a total mass Tm, with the magnitude of the total mass Tm represented by the relative length of arrow Tm. The total mass Tm comprises the mass of the tube 52", the bearing journals 60B, 68B, the tail and nose pieces 40A, 44A, and the counterweight 240. The total mass Tm has a center of mass Cm spaced apart from the rotational axis 28 by a radial distance of Rm. While the center of mass Cm is determined by the weight distribution of the novel balance shaft 20A irrespective of the rotational axis 28, the center of mass Cm is illustrated as spaced apart from the rotational axis 28 by radius Rm for comparison purposes. The novel balance shaft 20A has a balanced mass Tb having a center of mass Cb on the rotational axis 28, with the magnitude of the balanced mass Tb represented by the relative length of arrow Tb. The balanced mass Tb is the portion of the total mass Tm that is evenly distributed about the rotational axis 28.

Also shown in FIG. 14, the novel balance shaft 20A has a residual unbalance mass Tu having an unbalance center of mass Cu spaced apart from the rotational axis 28 by a radial distance of Ru. As previously described with respect to the first embodiment of the novel balance shaft 20 shown in FIG. 3, the unbalance mass Tu does not include the balanced mass Tb. Thus, the magnitude of the unbalance mass Tu is less than a magnitude of a total mass Tm of the novel balance shaft 20A. The center of mass Cm of the novel balance shaft 20A is illustrated by Cm spaced apart from the rotational axis 28 by a radial distance of Rm. The general location of the center of mass Cm is illustrated for comparison with the unbalance center of mass Cu. Also illustrated is a mass Tc of the counterweight 240 and a center of mass Cc of the counterweight 240. The center of mass Cc of the counterweight 240 is illustrated as being spaced apart from the rotational axis 28 by a radial distance of Rc. The mass Ts of the novel balance shaft 20A excluding the mass Tc of the counterweight 240 is illustrated as element Ts. The illustration shown in FIG. 14 of the radial positions of the unbalance center of mass Cu, the center of mass Cm of the novel balance shaft 20A, the center of mass Cc of the counterweight 240, as well as the magnitudes of the total mass Tm, the balanced mass Tb, the unbalance mass Tu, counterweight mass Tc, and the balance shaft mass Ts, are shown diagrammatically to represent relative valves and are not indicative of the actual values for these parameters Cu, Cm, Cc, Cb, Tu, Tm, Ts, Tc, Tb, Ru.

The length of arrows Tu, Tm, Tc, Ts, Tb shown in FIG. 14 are indicative of the comparative magnitudes of the unbalance mass Tu, total mass Tm, the balance shaft mass Ts, the balanced mass Tb, and the counterweight mass Tc. For example, adding the counterweight mass Tc with the balance shaft mass Ts results in the total mass Tm of the novel balance shaft 20. It will be appreciated that adjusting the magnitude and location of the counterweight 240 mass Tc directly affects the total mass Tm of the novel balance shaft 20A, the balanced mass Tb, and the unbalance mass Tu. Further, adjusting the counterweight 240 mass Tc and radial distance Rc of the counter weight center of mass Cc from the rotational axis 28 directly affects the magnitude and radial position Ru of the unbalance mass Tu. Of note, the relative positions of the centers of mass Cc, Cm, Cu, Cb along the novel balance shaft 20A in a longitudinal direction are not indicative of the relative longitudinal positions of these centers of mass Cc, Cm, Cu, Cb. The centers of mass Cc, Cm, Cu, Cb are spaced apart in the longitudinal direction purely for illustrative purposes. In fact, the centers of mass Cc, Cm, Cu, Cb can potentially align in the longitudinal direction depending on the positions and configurations of the various components 40A, 44A, 60A, 68A, 240 attached to the novel balance shaft 20A and the contour of the tube 52".

Referring to FIG. 14, in principle, typically the unbalance mass Tu, the radial position Ru of the unbalance center of mass Cu, as well as other parameters such as the total mass Tm and the balanced mass Tb, are selected to achieve a desired rotational inertia I for a specific engine 24 application. The values of the unbalance mass Tu and the radial distance Ru of the unbalance center of mass Cu can be adjusted within a range to achieve a targeted rotational inertia I. Thus, increasing and/or decreasing the magnitude of one or both of the unbalance mass Tu and the radial distance Ru will affect the actual rotational inertia I of the novel balance shaft 20A.

The second embodiment of the novel balance shaft 20A of FIG. 14 has a distinct benefit over traditional cast/forged shafts 20' (such as shown in FIG. 5) since the unbalance mass Tu and the radial distance Ru to the unbalance center of mass Cu can be adjusted by changing the mass Tc of the counterweight 240. Thus, the mass Tc of the counterweight 240 can be increased and/or decreased within a range if desired to fine tune the rotational inertia I of the novel balance shaft 20A. Therefore, the novel balance shaft 20A can be adjusted by solely changing the mass Tc of the counterweight 240 for use in a plurality of engine 24 applications requiring a range of rotational inertia I. For example, the unbalance mass Tu can be selectively increased by increasing the mass Tc of the counterweight 240. Further, increasing the mass Tc of the counterweight 240 can also increase the radial position Ru of the unbalance center of mass Cu. Since increasing the mass Tc of the counterweight 240 can potentially increase both the magnitude of the unbalance mass Tu and the radial position Ru of the unbalance center of mass Cu, small changes in the mass Tc of the counterweight 240 can significantly affect the rotational inertia I of the novel balance shaft 20A. Likewise, decreasing the mass Tc of the counterweight 240 can directly affect both the magnitude of the unbalance mass Tu and the radial position Ru of the unbalance center of mass Cu.

Figure 15:
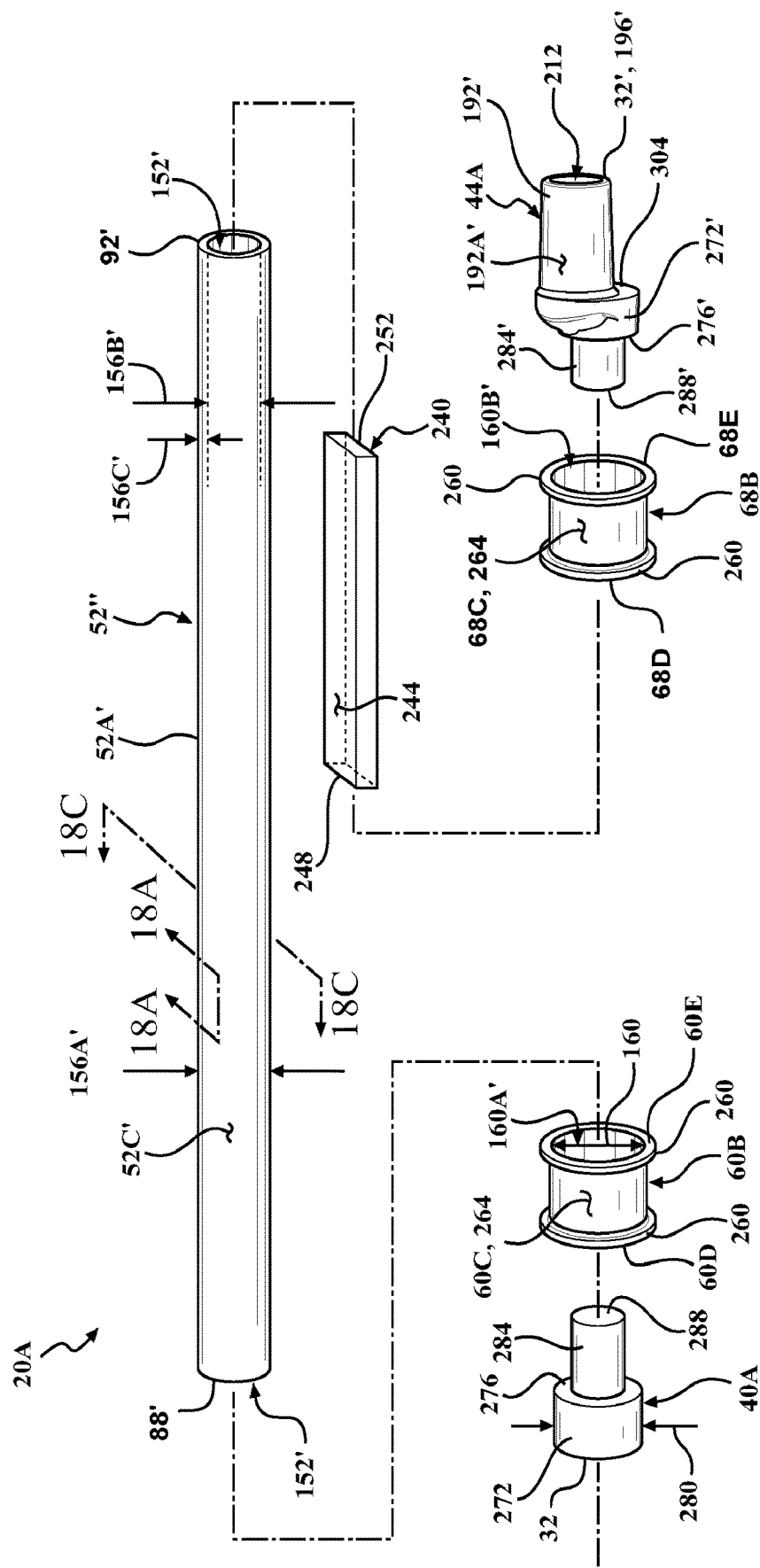
FIG. 15 is an exploded view of the balance shaft of FIG. 14 prior to a hydroforming process and a forming process and illustrating a tube, an internal counterweight, a front bearing journal, a rear bearing journal, a nose piece, and a tail piece.

Turning to FIG. 15, the novel balance shaft 20A includes a hollow tube 52" having a cylindrical-shaped wall 52A extending between opposing ends 88', 92' of the tube 52". A cylindrical-shaped passageway 152' extends longitudinally through the tube 52" between the opposing ends 88', 92'. The tube 52" has an outer diameter 156A', an inner diameter 156B', and a wall thickness 156C'. Preferably, the hollow tube 52" comprises a seamless tube 52" of a metal material having a lower yield strength than the yield strength of the metal material forming the front and rear bearing journals 68B, 60B.

Also shown in FIG. 15 are the tail piece 40A, the nose piece 44A, the counterweight 240, the rear bearing journal 60B, and the front bearing journal 60B. Each of these components 40A, 44A, 60B, 68B, 240 is preferably formed of steel, ductile iron, and the like.

The counterweight 240 is preferably a rectangular bar 240 having an outer surface 244 extending between opposing ends 248, 252, as illustrated in FIG. 15. Alternatively, the counterweight 240 can be a cylindrical shaped rod 240 or can comprise a contoured shape. Any shape of counterweight 240 can be selected as long as the counterweight 240 is sized to fit within the passageway 152' through the hollow tube 52".

The front and rear bearing journals 60B, 68B, illustrated in FIG. 15, can have identical dimensions and shapes for certain embodiments. In other embodiments, the front bearing journal 68B can have different dimensions and/or a different shape than the rear bearing journal 60B. Each of the bearing journals 60B, 68B are formed of a cylindrical-shaped outer wall 60C, 68C extending between opposing ends 60D, 60E, 68D, 68E. A passageway 160A', 160B' extends thru each bearing journal 60B, 68B configured to matingly engage with the outer diameter 156A' of the tube 52". In specific, the passageways 160A', 160B' extending through the bearing journals 60B, 68B have an inner diameter 160 that is larger than the outer diameter 156A' of the tube 52". In addition, each bearing journal 60B, 68B optionally includes a rim 260 extending circumferentially around the outer surface 60C, 68C adjacent each end 60D, 60E, 68D, 68E of the respective bearing journal 60B, 68B. The rims 260 form a channel 264 on the outer surface 60C, 68C of each of the bearing journals 60B, 68B to support a needle bearing or a plain bearing as required for a specific application.

The tail piece 40A, shown in FIGS. 14 and 15, comprises a generally cylindrical main body portion 272 extending between the end 32 of the tail piece 40A and a mounting surface 276. The mounting surface 276 is generally perpendicular to the longitudinal axis of the tail piece 40A. The generally cylindrical main body portion 272 can include a tapered surface or a can be multi-sided shape. The main body portion 272 is selectively configured to matingly engage with a gear/sprocket 36, 36A within a specific engine 24. Thus, the size and shape of the tail piece 40A can vary based on the requirements of the specific engine 24 application. Preferably, the main body portion 272 is dimensioned such that an outer diameter 280 of the main body portion 272 is equal or greater than the inner diameter 156B' of the tube 52". In addition, the embodiment shown in FIG. 15 includes a cylindrically-shaped projection 284 extending away from the mounting surface 276 of the tail piece 40A with an end surface 288 of the projection 284 defining an opposing end 288 of the tail piece 40A. The projection 284 is sized and shaped to fit within the passageway 152' of the tube 52". More specifically, the projection 284 has an outer diameter 290 being less than the inner diameter 156B' of the tube 52", as shown in FIG. 14. Further, when the projection 284 is inserted into the passageway 152' of the tube 52", the mounting surface 276 will frictionally engage with the end 88 of the tube 52".

The nose piece 44A, shown in FIGS. 14 and 15, has a generally cylindrically-shaped main body portion 272' extending between an end surface 304 and a mounting surface 276'. The main body portion 272' has an outer diameter 280' equal or greater than the inner diameter 156B' of the tube 52", as illustrated in FIG. 14. The mounting surface 276' is configured to frictionally engage with one end 92 of the tube 52". A cylindrically-shaped projection 284' extends perpendicularly away from the mounting surface 284' terminating at an end surface 288'. The projection 284' has an outer diameter 290' sized to fit within the passageway 152' of the tube 52". More specifically, the outer diameter 290' is smaller than the inner diameter 156B' of the tube 52". Further, the outer diameter 290' is less than the outer diameter 280' of the main body portion 272' of the nose piece 44A. Extending away from the end surface 304 of the nose piece 44A is an attachment portion 192' configured to matingly engage with a gear/sprocket 36, 36A as required for a specific engine 24 application. In the embodiment shown in FIGS. 14 and 15, the attachment portion 192' includes a tapered side wall 192A' extending from the end surface 304 to the end 196' of the nose piece 44A. A passageway 212 extends from the end 196' of the nose piece 44A towards the end surface 304 and configured to accept a bolt or other hardware to fixedly couple a gear/sprocket 36, 36A to the nose piece 44A. In the embodiment shown in FIGS. 14 and 15, the attachment portion 192' and the passageway 212 are configured to have a longitudinal axis 28 aligned with the rotational axis 28 after the novel balance shaft 20A is fully assembled. As shown in FIG. 14, the projection 284 of this embodiment has a longitudinal axis 308 that is offset from the longitudinal axis 28 of the passageway 212 and the attachment portion 192'. However, the overall configuration, shape, and dimensions of the nose piece 44A can be adjusted for other embodiments of the novel balance shaft 20A intended for different applications. Preferably, the nose piece 44A includes a mounting surface 276' and a projection 288' as illustrated in FIG. 15 such that the nose piece 44A can be assembled with the tube 52".

Figure 16:
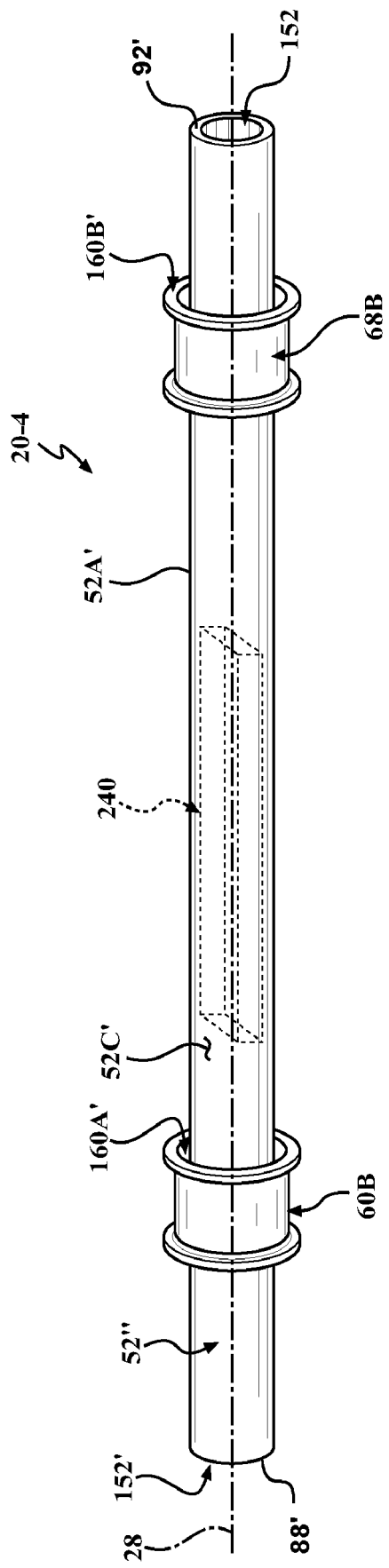
FIG. 16 is a perspective view of the tube of FIG. 15 assembled with the internal counterweight, the rear bearing journal, and the front bearing journal of FIG. 15 prior to the tube being deformed by a hydroforming process and a forming process.

The assembly method of the second embodiment of the novel balance shaft 20A is illustrated in FIGS. 16-20. Referring to FIG. 16, the counterweight 240 is inserted into the passageway 152' extending longitudinally through the tube 52". Further, the tube 52" is inserted through the passageways 160A', 160B' in the rear bearing journal 60B and the front bearing journal 68B. Alternatively, the front and rear bearing journals 68B, 60B are slid along the tube 52" to position the bearing journals 60B, 68B in predetermined positions. Assembling the counterweight 240 and the bearing journals 60B, 68B with the tube 52" forms a shaft subassembly 20-4 shown in FIG. 16.

Figure 17:
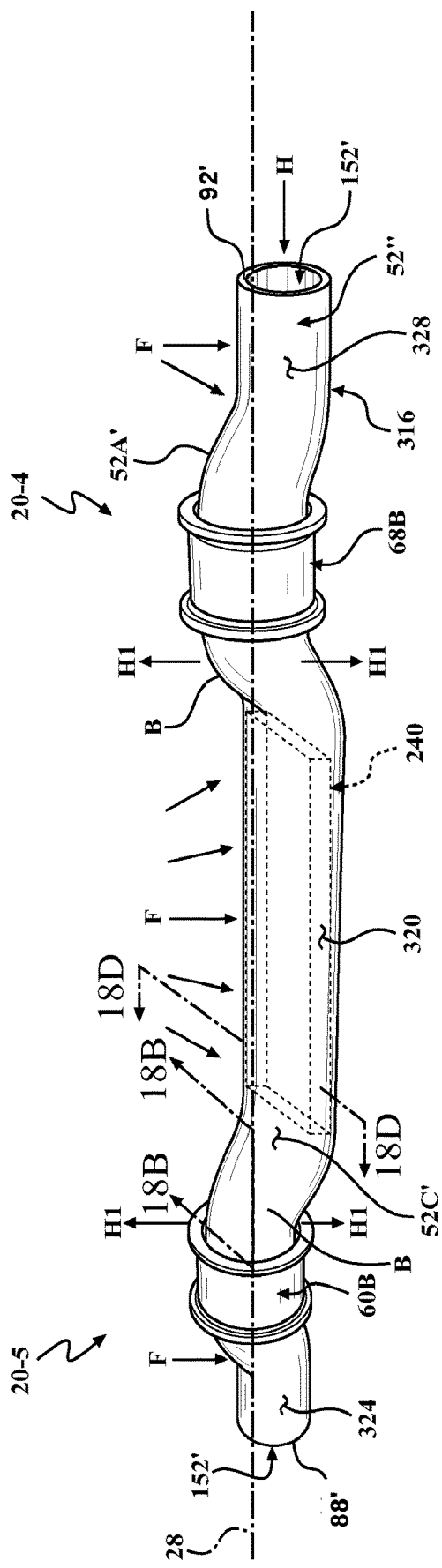
FIG. 17 is a perspective view of the assembled tube, internal counterweight, front bearing journal, and rear bearing journal of FIG. 16 after the tube is deformed by the hydroforming process and a forming process.

Next, the subassembly 20-4 undergoes a hydroforming process H shown in FIG. 17 wherein one or both ends 88', 92' of the tube 52" are sealed and fluid inserted into the tube 52", as illustrated by arrow H. The fluid pressure within the passageway 152' of the tube 52" applies pressure radially outward, as illustrated by arrows H1, expanding the outer surface 52A' of the tube 52". The tube 52" is expanded during the hydroforming process H to firmly seat the bearing journals 60B, 68B on the tube 52". After the hydroforming and forming processes H, F are complete, the fluid is removed from the passageway 152' through the tube 52".

Also shown in FIG. 17, the tube 52" undergoes a forming process F wherein force F is applied to the tube 52" to bend the tube 52" into a desired contour 316. In the embodiment shown in FIG. 17, the forming process F repositions a center portion 320, a rear portion 324, and a front portion 328 spaced apart from the rotational axis 28. Preferably, the tube 52" is formed by a die or a moving slide while the tube 52' is pressurized. Various embodiments having a range of overall contours 316 are envisioned to support a variety of engine 24 applications. In addition, the forming process F can lock the counterweight 240 in place within the tube 52" in some embodiments. In other embodiments, the counterweight 240 can be formed into a new shape within the tube 52" during the forming process F.

The hydroforming and forming processes H, F shown in FIG. 17 can be performed simultaneously on subassembly 20-4 or separately depending on desired manufacturing process flow. Further, the hydroforming process H can be performed prior to or after the forming process F. Completing both of the hydroforming and forming processes H, F transforms subassembly 20-4 into subassembly 20-5. The descriptions of various subassemblies 20-4, 20-5, and the like are purely descriptive and reflect the various stages of manufacture shown in the Figures. On exemplary manufacturing process includes the steps of placing the subassembly 20-4 on a lower forming tool, closing an upper forming tool against the lower forming tool, pressurizing the tube 52" (by inserting fluid within the passageway 152' of the tube 52") to hydroform the tube 52" such that the tube 52" is expanded to seat the bearing journals 60B, 68B. While the tube 52" is pressurized, force F is applied on the tube 52" by a die or a movable slide to form the contoured shape 316. After the hydroforming and forming processes H, F are complete, pressure is removed from the tube 52" by removing the remaining fluid in the tube 52".

Figure 18B:
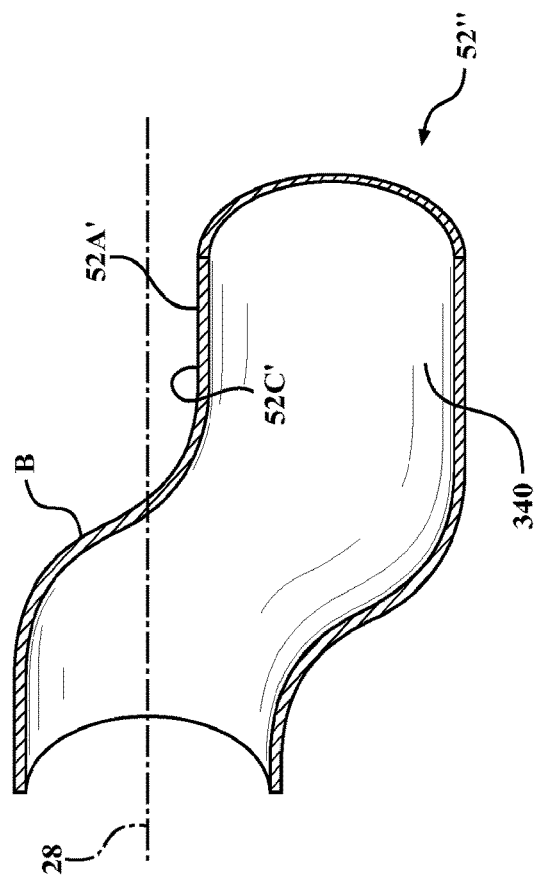
FIG. 18B illustrates a cross-sectional view along section line 18B-18B of the tube of FIG. 17 after the tube has been deformed by the hydroforming process and the forming process.
Figure 18A:
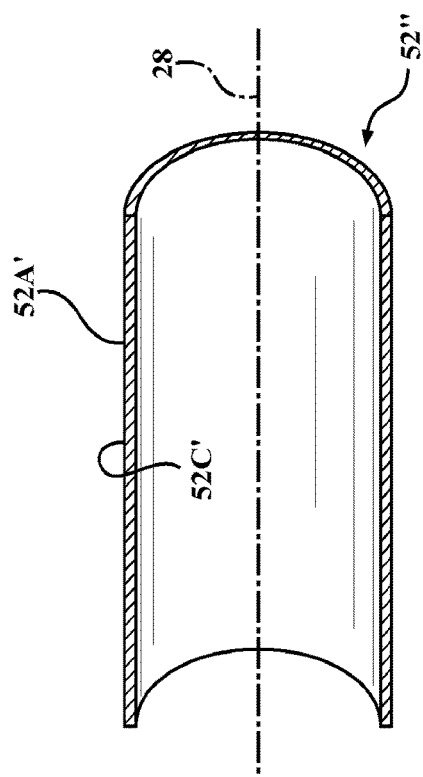
FIG. 18A illustrates a cross-sectional view along section line 18A-18A of the tube of FIG. 15 prior to the tube being deformed by the hydroforming process and the forming process.

FIGS. 18A-18D illustrate some of the changes in the shape of the tube 52" during the hydroforming process H and forming process F. FIG. 18A shows a cross-sectional view along section line 18A-18A of the tube 52" of FIG. 15 illustrating that the side wall 52A' of the tube 52" is initially cylindrical. FIG. 18B shows a cross-sectional view along section line 18B-18B of the tube 52" of FIG. 17 illustrating a bend B in the side wall 52A'. Further, a portion 340 of the tube 52" has been spaced apart from the rotational axis 28 during the forming process F, as shown in FIG. 18B.

Figure 18D:
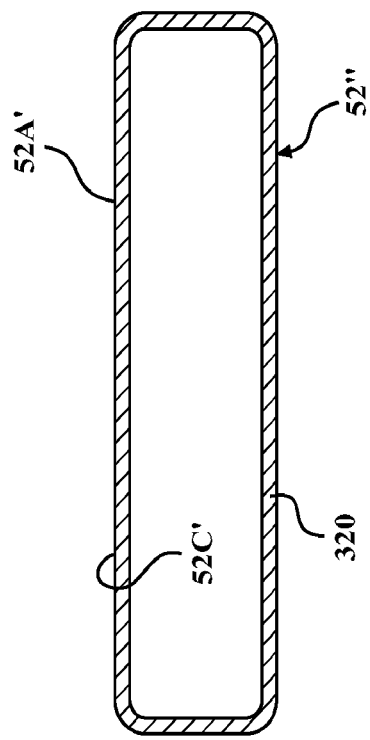
FIG. 18D illustrates a cross-sectional view along section line 18D-18D of the tube of FIG. 17 after the tube has been deformed by the hydroforming process and the forming process.
Figure 18C:
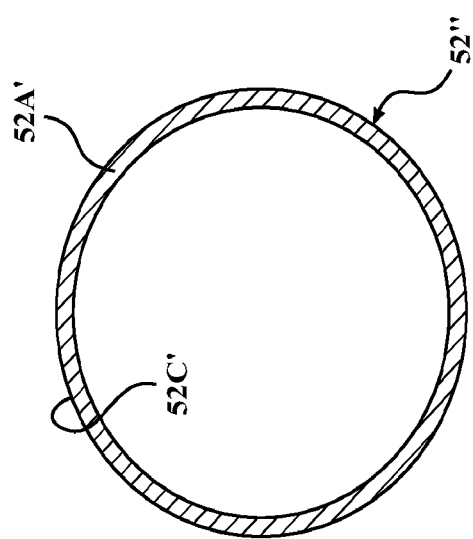
FIG. 18C illustrates a cross-sectional view along section line 18C-18C of the tube of FIG. 15 prior to the tube being deformed by the hydroforming process and the forming process.

FIG. 18C shows a cross-sectional view along section line 18C-18C of the tube 52" of FIG. 15 illustrating that the tube 52" has a circular profile prior to the hydroforming and forming processes H, F. FIG. 18D shows one embodiment of the cross-sectional shape of the tube 52" along section line 18D-18D of FIG. 17 after the hydroforming and forming processes H, F. In specific, the center portion 320 of the tube 52" is deformed to have a rounded rectangular cross-sectional shape. The bends B in the tube 52" along with the change in the cross-section in selected portions 320 of the tube 52" increases the bending stiffness of the tube 52". Further, repositioning a portion 320 of the tube 52" below the rotational axis 28 can adjust the amount of unbalance mass Tu as well as the rotational inertia I of the balance shaft 20A.

Figure 19:
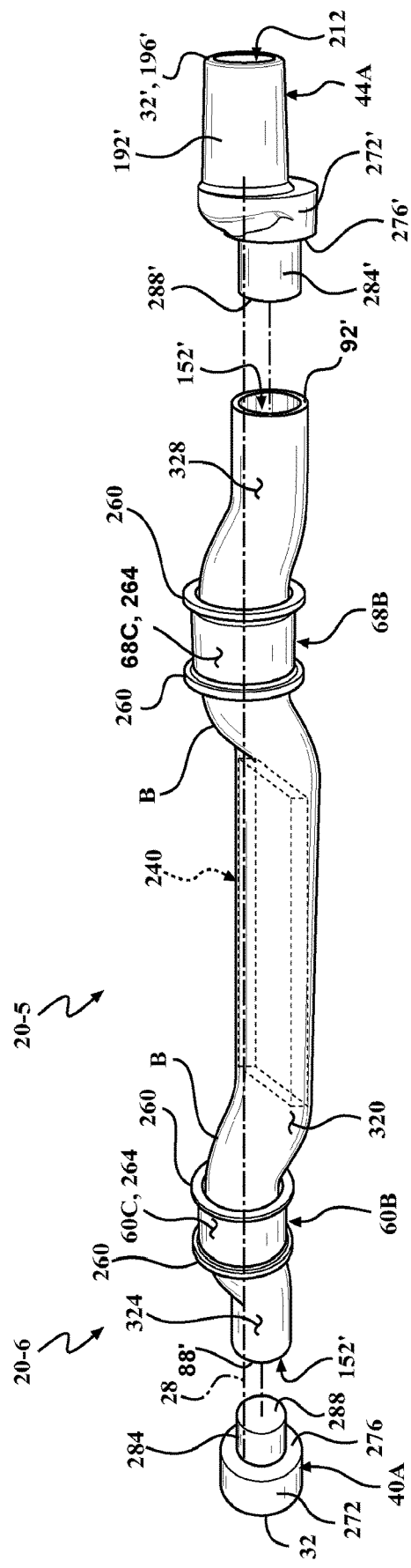
FIG. 19 is a perspective view of the tube, internal counterweight, front bearing journal, and rear bearing journal of FIG. 17 being assembled with the nose piece and the tail piece.

After the hydroforming H and forming F processes are complete, the subassembly 20-5 is assembled with the tail piece 40A and the nose piece 44A as illustrated in FIG. 19. The projections 284, 284' of the tail and nose pieces 40A, 44A, respectively, are inserted into opposing ends 88', 92' of the tube 52" to form subassembly 20-6. In one embodiment, the projections 284, 284' are press-fit into the passageway 152' of the tube 52", seating the mounting surfaces 276, 276' against the respective end 88', 92' of the tube 52".

Figure 20:
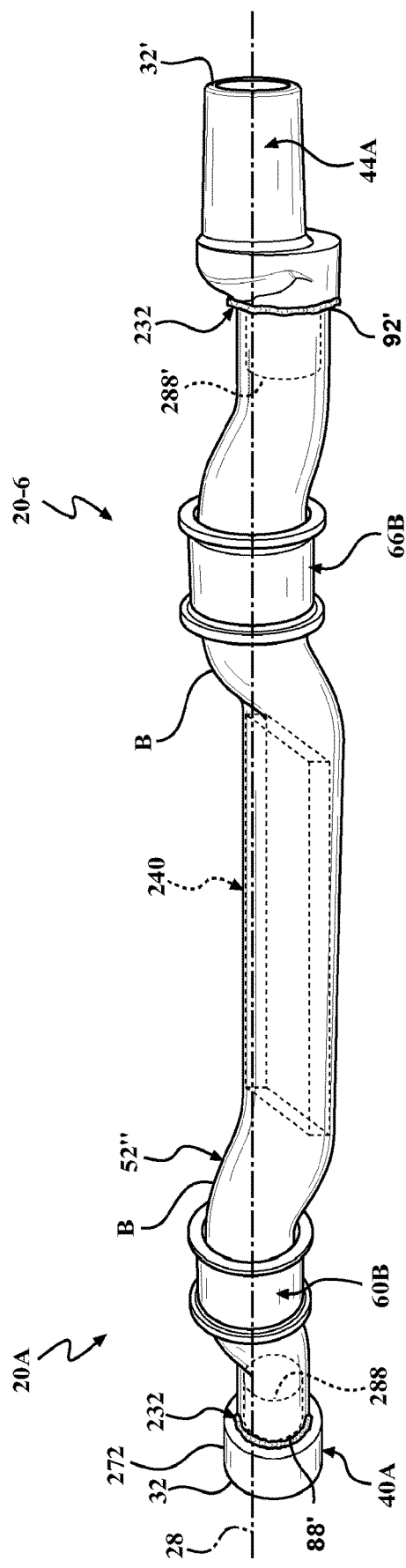
FIG. 20 is a perspective view of the balance shaft of FIG. 13 illustrating a welding process that fixedly couples the nose piece and the tail piece to the tube.

FIG. 20 illustrates the final step in the assembly process of the novel balance shaft 20A. The subassembly 20-6 optionally undergoes one or more welding processes to fasten the tail and nose pieces 40A, 44A to the tube 52", forming the novel balance shaft 20A. One or more laser weld seams 232 are formed near the ends 88', 92' of the tube 52" to fixedly couple the tail and nose pieces 40A, 44A to the tube 52". Other methods of attaching the tail and nose pieces 40A, 44A can be used, such as welding, adhesive, mechanical fasteners, and the like. Alternatively, the tail and nose pieces 40A, 44A can be press-fit as an assembly method using mechanical interference.

Figure 21:
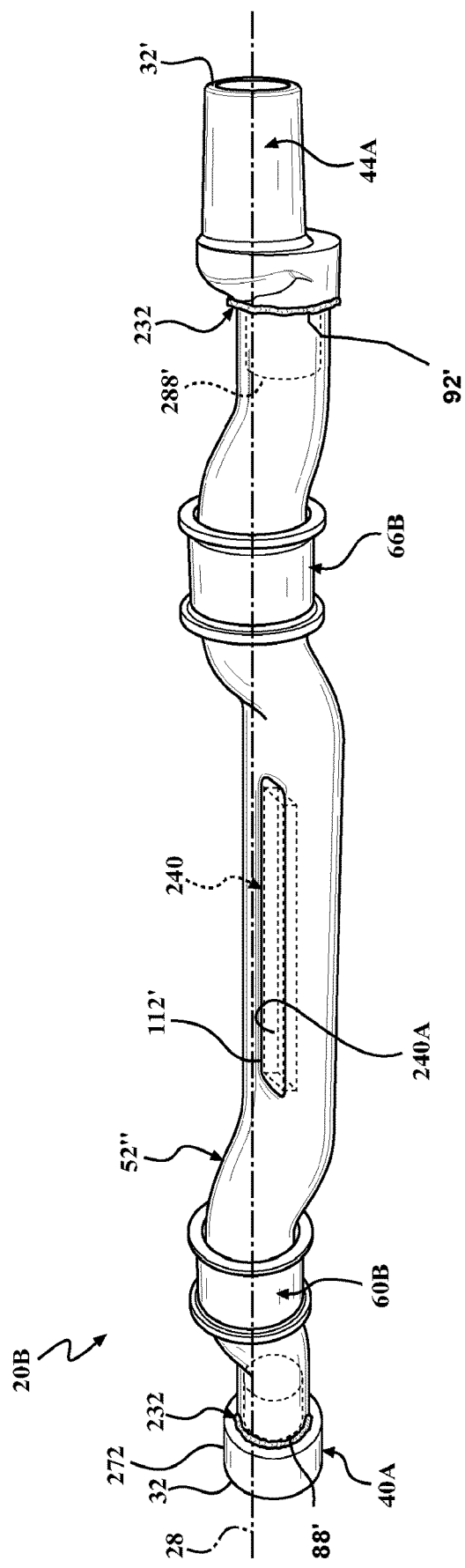
FIG. 21 is a perspective view of a third embodiment of an engine balance shaft having an internal counterweight, illustrating a contoured formed shape locking the internal counterweight in place within the tube.

FIG. 21 illustrates a third embodiment of the novel balance shaft 20B. The third embodiment is similar to the second embodiment shown in FIGS. 13-20 and is assembled using the same steps. However, the counterweight 240A of shaft 20B is smaller than the counterweight 240 of the novel balance shaft 20A shown in FIG. 19. Further, ridges 112' and/or grooves 112' are formed around an outer periphery of the counterweight 240A to lock the counterweight 240A in place within the tube 52".

Figure 22:
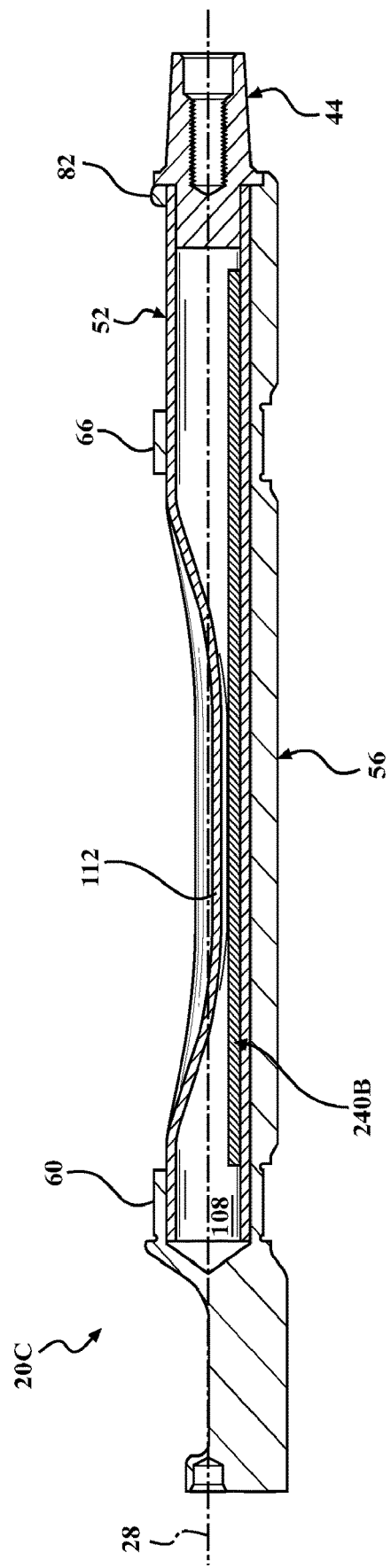
FIG. 22 is a cross-sectional view of a fourth embodiment of an engine balance shaft, illustrating an internal counterweight being assembled with the balance shaft of FIG. 4.

FIG. 22 illustrates an embodiment of the novel balance shaft 20C having both an external counterweight frame 56 as in the embodiment shown in FIG. 1 and an internal counterweight 240B as in the embodiment shown in FIG. 13. In the embodiment of FIG. 22, a counterweight 240B is inserted into the air void 108 of the tube 52 prior to the hydroforming and forming processes H, F on the tube 52. The option of including an internal counterweight 240B in combination with the external counterweight frame 56 further increases the flexibility of the novel balance shaft 20-20C.

One benefit of the novel engine balance shaft is the novel balance shaft has reduced mass in comparison to the traditional cast/forged balance shaft. Further, a second benefit is the novel balance shaft has a high cross sectional inertia such that the novel balance shaft has a high bending stiffness. A third benefit is the novel balance shaft has sufficient bending stiffness without requiring mass positioned at and/or above the axis of rotation. A fourth benefit is the novel balance shaft has lower rotational inertia than a traditional cast/forged balance shaft with similar outer shape. A fifth benefit is the novel balance shaft design can be easily customized for numerous engine applications. Finally, a sixth benefit is the novel balance shaft design allows for reuse of certain components during manufacturing of embodiments for different engine applications.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. An engine balance shaft for an internal combustion engine, said balance shaft comprising:

a hollow tube having a first side wall extending between a first end and a second end of said tube and a tube passageway extending longitudinally through said tube between a first end opening and a second end opening;

a front bearing journal having a first cylindrical wall with a first passageway extending between opposing ends of said first cylindrical wall, said first passageway configured such that at least a first portion of said tube passes through said first passageway;

a rear bearing journal having a second cylindrical wall with a second passageway extending between opposing ends of said second cylindrical wall, said second passageway configured such that at least said first portion of said tube passes through said second passageway;

an elongated counterweight configured to be fixedly coupled with said tube;

said balance shaft includes a tail piece fixedly coupled with said first end of said tube;

said tail piece enclosing said first end opening of said tube when said tail piece is assembled with said tube;

said balance shaft including a counterweight frame; and said counterweight frame being integrally formed with said elongated counterweight, said tail piece, said front bearing journal, and said rear bearing journal;

wherein after said tube is assembled with said front bearing journal and said rear bearing journal by passing said first portion of said tube through said first and second passageways, and after said tube is assembled with said elongated counterweight, said tube is expanded through a hydroforming process to fixedly couple said front and rear bearing journals on said tube; and wherein said counterweight frame being fixedly coupled to said first side wall of said tube when said tube is expanded by said hydroforming process, said balance shaft includes a nose piece fixedly coupled with said second end of said tube, and said nose piece enclosing said second end opening of said tube when said nose piece is assembled with said tube.

2. The engine balance shaft as set forth in claim 1, wherein:
each of said hollow tube, said front bearing journal, said rear bearing journal, said tail piece, and said nose piece being formed of metal.

3. The engine balance shaft as set forth in claim 2, wherein:
each of said front and rear bearing journals having a respective first and second longitudinal axis; and
a rotational axis of said balance shaft being defined by an imaginary reference line passing through said first and second longitudinal axes after said tube is inserted through said front and rear bearing journals.

4. The engine balance shaft as set forth in claim 3, wherein:
at least a portion of said tube having a non-cylindrical shape after said tube is deformed by said hydroforming process and a forming process; and
said tube having a cylindrical shape prior to said tube being deformed by said hydroforming process and said forming process.

5. The engine balance shaft as set forth in claim 3, wherein:
at least a portion of said tube having a non-rectangular shape after said tube is deformed by said hydroforming process and a forming process; and
said tube having a rectangular shape prior to said tube being deformed by said hydroforming process and said forming process.

6. The engine balance shaft as set forth in claim 4, wherein:
said tube comprising a first metal having a first yield strength;
said front and rear bearing journals comprising a second metal having a second yield strength; and
said first yield strength being lower than said second yield strength.

7. The engine balance shaft as set forth in claim 6, wherein:
said nose piece including a first mounting surface and a first projection extending away from said first mounting surface, said first projection configured to fit within said second end opening of said tube; and
said first projection being inserted through said second end opening and into said tube passageway until said second end of said tube frictionally engages with said first mounting surface.

8. The engine balance shaft as set forth in claim 1, wherein:
said first side wall of said tube being deformed to form a contoured portion extending in a longitudinal direction of said tube, said contoured portion being configured to increase a bending stiffness of said tube over the bending stiffness of said tube as measured prior to assembly of said tube with said front and rear bearing journals.

9. The engine balance shaft as set forth in claim 8, wherein:
said tube being a seamless tube comprising steel;
said counterweight frame comprising steel and/or ductile iron; and
said tube having an air void within said tube passageway through said tube.

10. The engine balance shaft as set forth in claim 9, wherein:
said nose piece being fixedly coupled to said tube by a weld extending between said nose piece and one or more of said first side wall of said tube, a support ring extending from said counterweight frame, and/or said counterweight frame.

11. The engine balance shaft as set forth in claim 9, wherein:
said nose piece being fixedly coupled to said tube by an elastic interference fitment between said nose piece and said tube passageway in said tube.

12. The engine balance shaft as set forth in claim 1, wherein:
said balance shaft further comprises a second counterweight, said second counterweight is inserted into an air void within said tube passageway of said tube, and said second counterweight is fixedly coupled to said tube when said tube is expanded by said hydroforming process.

13. The engine balance shaft as set forth in claim 12, wherein:
said second counterweight being positioned within said tube between said front and rear bearing journals.

14. The engine balance shaft as set forth in claim 13, wherein:
said tail piece including a second mounting surface and a second projection extending away from said second mounting surface, said second projection configured to fit within said first end opening of said tube; and
said second projection being inserted through said first end opening and into said tube passageway until said first end of said tube frictionally engages with said second mounting surface.

15. The engine balance shaft as set forth in claim 14, wherein:
said first side wall of said tube being deformed to form a contoured portion extending in a longitudinal direction of said tube, said contoured portion being configured to increase a bending stiffness of said tube over the bending stiffness of said tube as measured prior to assembly of said tube with said front and rear bearing journals.

16. The engine balance shaft as set forth in claim 15, wherein:
said tube being a seamless tube comprising steel; and
said tube having an air void within said tube passageway through said tube.

17. The engine balance shaft as set forth in claim 16, wherein:
said tail piece being fixedly coupled to said tube by a weld extending between said tail piece and said first side wall of said tube.

18. The engine balance shaft as set forth in claim 17, wherein:
  said nose piece being fixedly coupled to said tube by a weld extending between said nose piece and said first side wall of said tube.

19. The engine balance shaft as set forth in claim 16, wherein:
  said tail piece being fixedly coupled to said tube by an elastic interference fitment between said tail piece and said tube passageway in said tube.

20. The engine balance shaft as set forth in claim 19, wherein:
  said nose piece being fixedly coupled to said tube by an elastic interference fitment between said nose piece and said tube passageway of said tube.

21. The engine balance shaft as set forth in claim 16, wherein:
  each of said front and rear bearing journals having a respective first and second longitudinal axis;
  a rotational axis of said balance shaft being defined by an imaginary reference line passing through said first and second longitudinal axes after said tube is inserted through said front and rear bearing journals; and
  said elongated counterweight having a center of mass offset from said rotational axis of said balance shaft.

* * * * *